United States Patent
Lerman et al.

(10) Patent No.: US 10,393,612 B2
(45) Date of Patent: Aug. 27, 2019

(54) INSPECTION SMOKE MACHINE

(71) Applicant: PROFLEX+ DISTRIBUTION INC., Dollard-Des Ormeaux (CA)

(72) Inventors: Jeffrey Lerman, Côte St. Luc (CA); Nathan Goldman, Dollard-des-Ormeaux (CA); Changbin Quan, Shenzhen (CN)

(73) Assignee: PROFLEX+DISTRIBUTION INC., Dollard-Des-Ormeaux, QC (CA)

( * ) Notice: Subject to any disclaimer, the term of this patent is extended or adjusted under 35 U.S.C. 154(b) by 0 days.

(21) Appl. No.: 15/848,971

(22) Filed: Dec. 20, 2017

(65) Prior Publication Data

US 2018/0136073 A1   May 17, 2018

Related U.S. Application Data

(63) Continuation of application No. PCT/CA2016/051074, filed on Sep. 12, 2016.
(Continued)

(51) Int. Cl.
| | |
|---|---|
| *G01M 3/20* | (2006.01) |
| *G01M 3/22* | (2006.01) |
| *A63J 5/02* | (2006.01) |
| *G01M 3/02* | (2006.01) |
| *G01M 3/04* | (2006.01) |

(Continued)

(52) U.S. Cl.
CPC ............. *G01M 3/22* (2013.01); *A63J 5/025* (2013.01); *G01M 3/025* (2013.01); *G01M 3/04* (2013.01); *G01M 3/20* (2013.01); *G01M 15/02* (2013.01); *A24F 47/008* (2013.01); *F41H 9/06* (2013.01)

(58) Field of Classification Search
CPC ........ G01M 15/02; G01M 3/025; G01M 3/04; G01M 3/22; A63J 5/025; F41H 9/06
See application file for complete search history.

(56) References Cited

U.S. PATENT DOCUMENTS

| | | |
|---|---|---|
| 2,882,240 A | 4/1959 | Charwat |
| 3,003,279 A | 10/1961 | Bonanno |
| | (Continued) | |

FOREIGN PATENT DOCUMENTS

ES   2437816   1/2014

OTHER PUBLICATIONS

PCT/CA2016/051074 IPRP with amended claims.
(Continued)

*Primary Examiner* — Daniel S Larkin
(74) *Attorney, Agent, or Firm* — Anglehart et al.

(57) ABSTRACT

Provided is a smoke machine that comprises a heating element disposed within a chamber wherein smoke is created. The chamber may contain a liquid reservoir containing a liquid that creates visible smoke when heated, e.g. to the point of vaporization, evaporation and/or condensation. A liquid transfer device transfers the liquid from the reservoir towards the heating element. The liquid transfer device may be provided around the periphery of the heating element, e.g. by being wrapped or coiled around it, of by having the heating element inserted in it. It may be tied in place or fastened by a fastener. It may be held by friction fit provided by a friction allowing wicking but providing substantially complete coverage of the heating element or part thereof. Also provided is a smoke machine that comprises a pressure controller.

10 Claims, 5 Drawing Sheets

Related U.S. Application Data

(60) Provisional application No. 62/217,900, filed on Sep. 13, 2015, provisional application No. 62/350,464, filed on Jun. 15, 2016.

(51) Int. Cl.
    *G01M 15/02*   (2006.01)
    *A24F 47/00*   (2006.01)
    *F41H 9/06*    (2006.01)

(56) References Cited

U.S. PATENT DOCUMENTS

| | | |
|---|---|---|
| 3,093,596 A | 6/1963 | Cone |
| 3,250,723 A | 5/1966 | Fortney |
| 3,432,439 A | 3/1969 | Dickman |
| 3,990,987 A | 11/1976 | Rogers |
| 4,155,249 A | 5/1979 | Scott |
| 4,271,693 A | 6/1981 | Bute |
| 4,282,113 A | 8/1981 | Kiley |
| 4,303,397 A | 12/1981 | Swiatosz |
| 4,326,119 A | 4/1982 | Swiatosz |
| 4,330,428 A | 5/1982 | Clifford |
| 4,349,723 A | 9/1982 | Swiatosz |
| 4,493,211 A | 1/1985 | Weinstein |
| 4,547,656 A | 10/1985 | Swiatosz et al. |
| 4,764,660 A | 8/1988 | Swiatosz |
| 4,818,843 A | 4/1989 | Swiatosz |
| 4,871,115 A | 10/1989 | Hessey |
| 4,998,479 A | 3/1991 | Perham et al. |
| 5,107,698 A | 4/1992 | Gilliam |
| 5,168,544 A | 12/1992 | Kolasa |
| 5,220,637 A | 6/1993 | Levin, III et al. |
| 5,367,603 A | 11/1994 | Wenrich et al. |
| 5,647,054 A | 7/1997 | Jones |
| 5,753,800 A | 5/1998 | Gilliam |
| 5,803,359 A | 9/1998 | Vandoninck |
| 5,859,363 A | 1/1999 | Gouge |
| 5,870,524 A | 2/1999 | Swiatosz |
| 5,922,944 A | 7/1999 | Pieroni et al. |
| 5,937,141 A | 8/1999 | Swiatosz |
| 6,392,227 B1 | 5/2002 | Banyard et al. |
| 6,439,031 B1 | 8/2002 | Pieroni et al. |
| 6,477,890 B1 | 11/2002 | Hulsebus |
| 6,526,808 B1 | 3/2003 | Pieroni et al. |
| RE38,686 E | 1/2005 | Loblick |
| 6,865,341 B1 | 3/2005 | Hurley |
| 6,907,771 B2 | 6/2005 | Finlay et al. |
| 7,305,176 B1 | 12/2007 | Pieroni |
| 7,852,227 B2 | 12/2010 | Pepper et al. |
| 8,375,770 B2 | 2/2013 | Lund |
| 8,393,235 B2 | 3/2013 | Ciborowski et al. |
| 8,408,047 B2 | 4/2013 | McCollom |
| 8,737,826 B2 | 5/2014 | Stauffer et al. |
| 8,998,170 B2 | 4/2015 | McCollom |
| 9,417,152 B2 * | 8/2016 | McCollom .............. G01M 3/22 |
| 9,541,467 B2 * | 1/2017 | McCollom .............. G01M 3/20 |
| 2009/0315326 A1 | 12/2009 | Pieroni |
| 2012/0024976 A1 | 2/2012 | Betcher et al. |
| 2012/0266660 A1 | 10/2012 | Parker |
| 2013/0175268 A1 | 7/2013 | McCollom |
| 2014/0069174 A1 | 3/2014 | Banyard et al. |
| 2014/0083168 A1 | 3/2014 | Parker et al. |
| 2015/0114091 A1 | 4/2015 | McCollom |

OTHER PUBLICATIONS

PCT/CA2016/051074 ISR.
PCT/CA2016/051074 search strategy.
PCT/CA2016/051074 written opinion.

* cited by examiner

INSPECTION SMOKE MACHINE

This application is a continuation of PCT application PCT/CA2016/051074 filed Sep. 12, 2016, which claims the benefit of priority of U.S. provisional patent applications 62/217,900 filed Sep. 13, 2015 and 62/350,464 filed Jun. 15, 2016.

TECHNICAL FIELD

The present invention relates generally to the field of vapor generating devices used to test the integrity of a fluid system, and, more specifically, to a vapor generating device characterized by multiple different pressure operating modes, such that it can easily be used to test various fluid systems having different inspection pressure requirements. The present invention also relates to a vapor generating device using heating elements to create vapor from a liquid.

BACKGROUND

Many useful systems contain and/or operate using a fluid (gas, liquid or combination of both). For example, automobiles have several systems which contain and utilize a fluid in their operation, including the fuel system, the exhaust system, the heating, cooling and ventilation (HVAC) system, and the hydraulic power steering and brake systems, to name but a few. There are also many industrial machines, household HVAC systems and other devices that utilize a fluid to operate, which fluid may be for example a gas such as air or evaporated system liquid, fuel, hydraulic fluids, manufactured gases and liquids, etc. In all of these systems and circumstances, the fluid system must be properly sealed to prevent leakage of the system fluid; however, leaks in such fluid systems can be very difficult to detect and/or locate, either because the leak is small or in a location that is not easily accessible.

Vapor generating apparatuses or devices are known for generating a visible gas or vapor that is mixed with air supplied thereto under pressure so that the mixture can be delivered to a fluid system undergoing testing for leaks. Although these apparatuses are commonly described as smoke machines, the "smoke" is typically a non-toxic aerosol mist produced by evaporation and condensation at controlled temperatures rather than actual smoke. In the context of the following description, "smoke" refers to either a solution (e.g., petroleum-based) that is heated and vaporized or to a visible aerosol mist, spray, gas, vapor or combination thereof. By observing any visible "smoke" which exits a small and often visually imperceptible hole in the system under test, an indication is provided to the observer of the presence and location of the leak so that a repair might be made.

The use of smoke machines to detect leaks in internal combustion engine systems are well known in the art. More specifically, such leak detection systems are extensively used in engine diagnostic and maintenance procedures, and in particular can be used to find leaks in EVAP systems, valves, gaskets, hoses, vacuum lines and reservoirs, throttle bodies, EGR valves, air intake ducting, intake manifolds, and exhaust systems among others.

Historically, smoke machines have been designed to deliver vapor into the automobile system under test at the standard EVAP test pressure of 12-14 inches of water column pressure (0.47 psi). Leak testing of the different automobile systems of naturally aspirated internal combustion engines at this low pressure has been quite effective and useful. Since the maximum load on the air intake system of a naturally aspirated internal combustion engine is approximately 1 psi of vacuum at idle, a test pressure (0.47 psi) at approximately half of maximum load (1 psi) is adequate to find leaks.

However, in an effort to gain more power using less fuel, automobile manufacturers are increasingly turning to a gas compressor used for forced induction or boosting the air induction system of internal combustion engines by utilizing mechanical superchargers, exhaust gas turbines, turbo chargers and multiple turbo chargers among others. The amount of boost or increased intake pressure in these boosted engines can be 6-9 psi on the low end of smaller engines, up to and exceeding 36-40 psi under full load for larger engines. Consequently, the standard EVAP test pressure of 0.471 psi is insufficient to detect and locate leaks when the system under test is under 12 to 80 times more pressure under full load.

Vapor generating devices specifically designed or adapted to detect leaks in such high pressure forced induction systems are also known in the art. In the example of U.S. Pat. No. 8,737,826 entitled HIGH PRESSURE SMOKE MACHINE and dated May 27, 2014, there is described a smoke machine that can produce a controlled vapor at a test pressure of up to and exceeding 30 psi, for safe usage for leak determination and location in internal combustion engines with forced induction systems.

Different types of fluid systems clearly have different inspection pressure requirements. As such, a vapor generating device designed to operate at a specific test pressure is only useful for leak detection and location in those fluid systems for which the respective inspection pressure requirement matches or is within a tolerance of the specific test pressure. For example, a smoke machine designed to produce vapor at the standard test pressure of 0.471 psi can be used for leak detection and location in a naturally aspirated internal combustion engine, but likely would not be efficient in a boosted, forced induction engine. Similarly, a smoke machine designed to produce vapor at a test pressure of 30 psi can be used for leak detection and location in a forced induction engine, but not in a naturally aspirated internal combustion engine, since the excessive test pressure would damage the engine systems that are designed to contain a much lower pressure (e.g. 1 psi).

In the auto mechanic industry, or other such similar industrial/commercial vehicle service industry, it becomes expensive to stock multiple different smoke machines in order to be able to perform leak detection and location on different fluid systems having different inspection (test) pressure requirements. Even if a smoke machine could be adapted (e.g. by changing a heating surface area) to produce vapor at different test pressures, it would be inefficient and time consuming to have to perform such adaptation each time a fluid system to be verified requires a different inspection pressure.

Furthermore, equipment having replaceable parts require maintenance to replace such parts. It is desirable to make the replacement of such part as easy and rapid as possible and to require as little expertise as possible so as to make replacing parts cheap and to make the equipment serviceable by non-professionals.

Moreover, in smoke machines, the efficient generation of smoke from fuels for such smoke, by wasting as little energy as possible, e.g. on heat that is not put to use towards the creation of smoke, is essential.

Consequently, there exists a need in the industry for an improved vapor generating device that can be easily serviced while efficiently utilising fuel and energy towards smoke creation and that can be easily manipulated to test different fluid systems having different inspection pressure requirements.

SUMMARY

In a broad aspect, the present invention provides a smoke generating device for connection to a source of pressurized gas. The device includes a housing defining a chamber, and a heating element disposed within the chamber. The chamber includes a liquid reservoir for holding a supply of liquid. The device also includes a gas inlet for connection to the source of pressurized gas; a gas supply fluid path extending from the source of pressurized gas to the gas inlet, through the housing and into the chamber; a liquid transfer device configured to convey a liquid from the liquid reservoir to the heating element; as well as an outlet conduit in fluid communication with the chamber and configured to convey vapor from the chamber. The device further includes a pressure controller responsive to activation of an operating mode selector control to switch the smoke machine between at least first and second pressure operating modes, in the first pressure operating mode the smoke machine being capable to output pressurized vapor at a first test pressure and in the second pressure operating mode the smoke machine being capable to output pressurized vapor at a second test pressure.

In another broad aspect, the present invention provides a smoke machine for connection to a source of pressurized gas and operative to generate smoke at a test pressure for output to a closed fluid system to be tested for leaks, the smoke machine capable to automatically switch between first and second pressure operating modes in response to activation of an operating mode selector control, wherein in the first pressure operating mode the smoke machine outputs smoke at a first test pressure and in the second pressure operating mode the smoke machine outputs smoke at a second test pressure.

In another broad aspect, the present invention provides a smoke generating device for connection to a source of pressurized gas. The device comprises a housing defining a chamber, the chamber including a liquid reservoir for holding a supply of liquid. The device also comprises a gas inlet for connection to the source of pressurized gas. The device also comprises a gas supply fluid path extending from said gas inlet, through said housing and into said chamber. The device also comprises a smoke outlet for outputting smoke. The device also comprises a smoke liquid path extending from said chamber through said housing to outside of said housing to convey smoke from said chamber to outside of said housing. The device also comprises a heating element having a pair of electrical terminals for receiving electrical power and a heating body powered by the electrical power disposed within said chamber. The device also comprises a wicking liquid transfer device configured to convey a liquid from said liquid reservoir to said heating element by capillary action. The wicking liquid transfer device comprises a first portion substantially surrounding and applied to the heating body in a friction fit providing a pressure by the wicking liquid transfer device holding the first portion in substantial complete coverage of the heating body. The wicking liquid transfer device also comprises a second portion projecting from the first portion into the liquid reservoir for absorbing the liquid and by capillary action transferring liquid from the liquid reservoir to the first portion.

In some embodiments, the heating body is a ceramic heater. A ceramic heater can comprise a ceramic material having a conductive filler to provide requisite conductivity for operating as a resistive heating element. A ceramic heater has no exposed metal heating element that can corrode and fail, and so is more durable. The wicking liquid transfer device can also be easily separated from the heating body to allow for replacement, if required, of either the wicking liquid transfer device or the heating body.

The smoke generating device described herein can find application in combustion engine systems as well as refrigeration systems, gas stoves or any other device that has fluid conduits whose integrity needs inspection.

BRIEF DESCRIPTION OF THE DRAWINGS

The invention will be better understood by way of the following detailed description of embodiments of the invention with reference to the appended drawings, in which.

DETAILED DESCRIPTION

The present invention relates to a variable pressure smoke machine characterized by different pressure operating modes. In a first pressure operating mode, the smoke machine is operative to generate vapor at a first predefined test pressure, while in the second pressure operating mode, the smoke machine is operative to generate vapor at a second predefined test pressure. The variable pressure smoke machine has a pressure controller responsive to activation of an operating mode selector control to cause the smoke machine to switch between the first and second pressure operating modes.

The present invention also relates to an improved smoke machine characterized by a novel wick and heater arrangement. The heater can be a ceramic heater that has improved durability. The wick can be easily wrapped around the heater, and easily removed for replacement of either the wick or the heater if required.

Note that, while the term "smoke" generally refers to the vapor and particulate that is a by-product of incomplete combustion, for the purposes of the present description the term "smoke" includes any visible gas, vapor and/or aerosol (particulate suspended in a gas) or any combination thereof.

Also note that, for the purposes of the present description, the term "vaporize" means to transform a liquid into smoke, while the term "primarily capillary action" (or other similar term) means that the liquid is conveyed by this type of force more than any other force (such as pumping, or pressure differentials caused by suction), but does not exclude that some force may be applied to the liquid by modes other than capillary action.

Figure 1A:
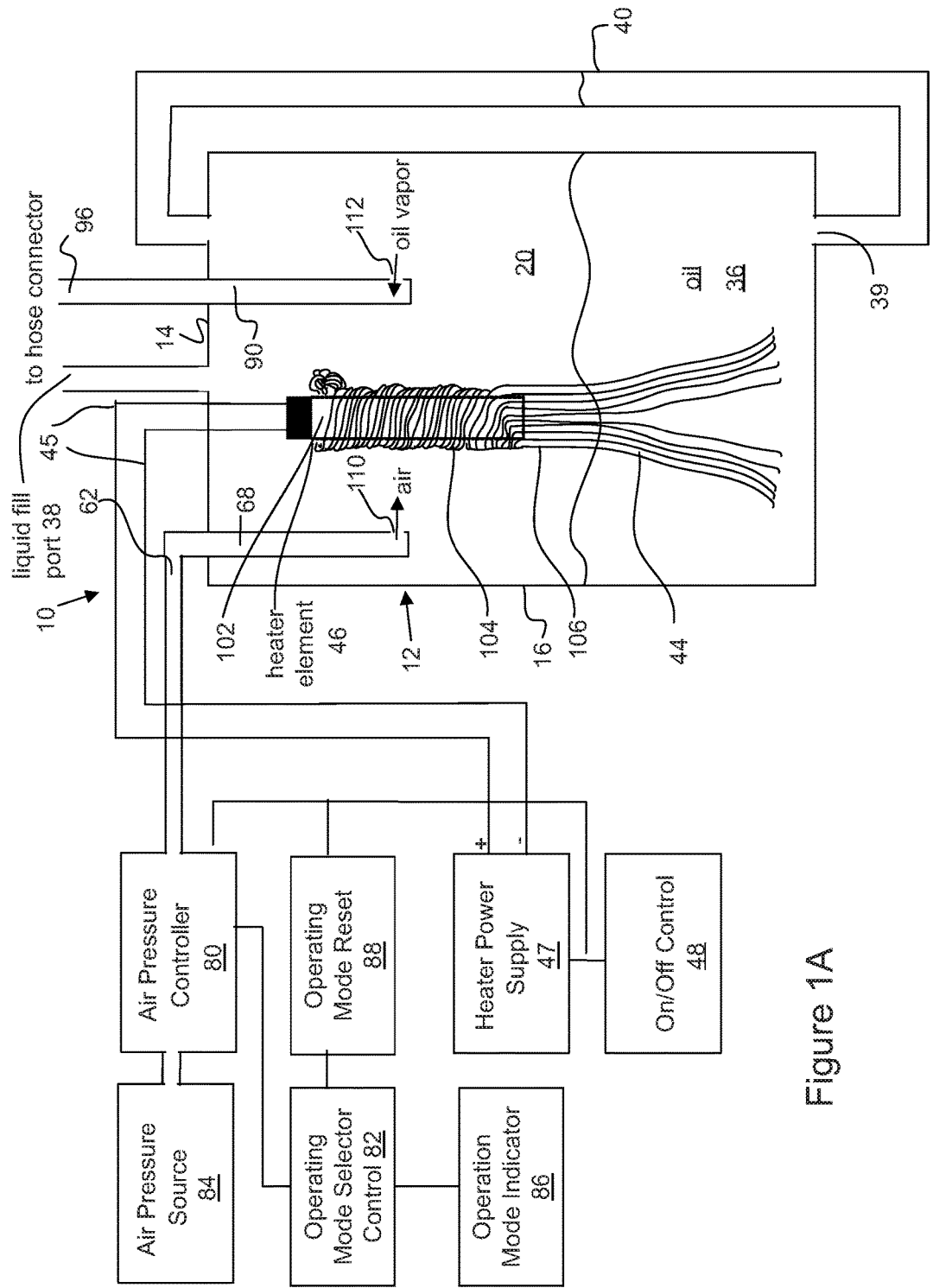
FIG. 1A is a schematic view of an exemplary variable pressure smoke machine with a liquid transfer device surrounding a heating element in accordance with the teachings of the present invention.

With reference to FIG. 1A, a smoke machine 10 according to an embodiment of the present invention comprises a housing 12 having a top cover 14 and a main body 16, which provide a smoke generating chamber 20. The top cover or lid 14 can be removable for maintenance or for filling the reservoir (a separate fill hole and cap can be provided for filling if desired). A hook (not shown) may be attached to the top cover 14 of the housing 12 for hanging the smoke machine 10 in a convenient location when the smoke machine 10 is being used to test the integrity of a fluid system, for example under the hood of an automobile.

In the present example, the top cover 14 is removably secured to the main body 16, for example using mechanical fasteners (e.g. screws and mating through-holes, clips, mating threaded portions, etc.). A seal or gasket may be used to seal the interface between the top cover 14 and the main body 16.

Optionally, a pressure gauge (not shown) may be attached to either the top cover 14 or the main body 16, for measuring and displaying the pressure in the chamber 20.

Note that the top cover 14 and main body 16 may be made of aluminum or of any other suitable material, such as stainless steel or plastic.

The main body 16 is preferably a machined aluminum component, but may be manufactured by any other suitable process. The main body 16 defines a liquid reservoir 36 within the chamber 20 for holding smoke producing liquid. In order to fill the liquid reservoir 36 with smoke producing liquid, a liquid fill port 38 is optionally provided in the top cover 14, via which port 38 liquid may be poured into the liquid reservoir 36 of the chamber 20. In this example, the liquid fill port is provided on a tubular extension of the top cover 14 and can be sealed shut using a screw-on cap (not shown). Alternatively, in the absence of a liquid fill port 38, the top cover 14 of the housing 12 may simply be removed to allow liquid to be poured into the liquid reservoir 36.

Note that the material of the liquid reservoir 36 is that of the housing 12, e.g. aluminium. However, in a variant embodiment, a liner or insert of any other suitable material which is compatible with the particular smoke producing liquid(s) being used may be provided within the liquid reservoir 36 to contain the liquid.

The machine 10 also optionally includes a liquid level indicator 40 allowing the observation of a level of liquid in the liquid reservoir 36 without removing the top cover 14 of the housing 12. As shown in FIGS. 1 to 4, a specific, non-limiting example of this liquid level indicator 40 is a conduit, such as a tube of transparent plastic material, provided external to the housing 12 and extending between the liquid fill port 38 and a port 39 provided in or near the bottom surface of the housing 12, the port 39 feeding directly into the liquid reservoir 36. In this example, the level of the liquid that can be seen in the tube is indicative of the level of liquid within the reservoir 36. Alternatively, the liquid level indicator 40 may be a dipstick, where the shaft of the dipstick would extend from the top cover 14 via the liquid fill port 38, down through the chamber 20 and into the liquid reservoir 36. As a further alternative a clear window may be provided as a liquid level indicator in the main body 16 to allow visual observation of the liquid within. In such a case, the clear window is preferably made of heat and pressure resistant material and securely sealed to the rest of the main body 16. As yet a further alternative, a level sensor could be provided in the chamber 20. In the case of an electronic level sensor, a low liquid level signal can be connected into the controller to shut down the power supply 47 when the liquid level is too low for operation.

The smoke producing liquid is a liquid which, when heated to a certain temperature, will produce a non-toxic smoke. Suitable liquids include non-toxic petroleum based oils, such as mineral oil (baby oil) for example.

In a specific, non-limiting example of implementation, a liquid transfer device 44 extends from within the chamber 20 down into the liquid reservoir 36. The bottom end of the liquid transfer device 44 preferably extends almost to the bottom of the liquid reservoir 36. The liquid transfer device 44 uses primarily capillary action to convey smoke producing liquid from the liquid reservoir 36 up to the vicinity of a heating element 46. In this example, the second portion may extend towards the bottom of the liquid reservoir 36 nearly reaching to the bottom. As is well known in the art, capillary action refers to the motive force on a liquid produced by the surface tension between the liquid and a surface, in this case the smoke producing liquid and the material of the liquid transfer device 44.

In order to prevent the generation of unwanted combustion smoke and the premature wearing of the liquid transfer device 44, the liquid transfer device 44 of this example comprises material that is able to withstand very high temperatures while also producing enough capillary action to convey the liquid from the liquid reservoir 36 to the heating element 46. In a specific, non-limiting example of implementation, the liquid transfer device 44 is a "loose" bundle of fibreglass fibers that are not braided, twisted or woven. The fibers are collected and arranged sufficiently close to each other to wick the smoke generating liquid up from the reservoir and onto the heater. This requires sufficient proximity for capillary action to take place, without such tightness that capillary action is prevented. The ability to wick also depend on the properties of the smoke generating liquid, and in the case of baby oil, loose fibreglass fibers are drawn into one another by the surface tension of the liquid and wicking works well. Fiberglass is an example of a material that resists the temperature of the heater (around 300 degrees Celsius) well. Alternatively, a woven wick, twisted or braided cord made of suitable wicking fibers can be used as long as temperature resistance and wicking ability are present. The wick or wicking fibers can convey an adequate amount of liquid by capillary action to the heating element to produce an ample amount of smoke.

Advantageously, rather than using a filament heating element that is wrapped around the liquid transfer device, in the illustrated example, the liquid transfer device 44 itself surrounds the heating element 46 or part thereof. This makes installing, and replacing the liquid transfer device 44 a simple task and also allows the liquid transfer device 44 to potentially contact the entire heating surface of the heating element 46.

In the example of FIG. 1A, the liquid transfer device 44 comprises a wicking bundle of fiberglass fibers that is wrapped around the heating body 102 to substantially surround it, viz. to surround it about at least a portion of its length. The wicking bundle can alternatively comprise a variety of synthetic or natural fibers and can be braided cord, twisted cord, a woven fabric or of any suitable bundling of the fibers that can provide wicking. In this case, the wicking bundle is wrapped around the heating body 102 from the bottom of the heating body up to the top and therefore essentially completely covers the surface area of the heating body 102 save perhaps for a few millimeters at the top and minor portions that may be visible between wraps. Despite such imperfections in the wrapping, the liquid transfer device 44 is said to completely cover the surface of the heating body 102 since it does not leave a significant portion of the heating body uncovered.

In order to hold the first portion 104 of the liquid transfer device 44, that is the wicking fiber bundle, in place, the wicking fiber bundle is wrapped around the heating body 102. Provided that the presence of the liquid does not interfere with heating element 46 operation, the wicking fiber bundle may be also wrapped around other portions of the heating element 46.

The wicking fiber bundle is tightly wrapped around the heating body and held in place by a suitable mechanism. As shown in FIG. 1A, the wicking fiber bundle is tied into place using the fiber bundle itself at the bottom and at the top of the ceramic heater. Different techniques may be used to wrap and tie off the wicking fiber bundle. In order to maintain the wicking fiber bundle in place and prevent it from unravelling from the end opposite the tie off, that end may be passed underneath the coil to hold it in place. In one example, the wicking fiber bundle may be run vertically along the heating body 102, folded down, and then coiled over itself around the heating body towards the bottom where it may be tied with the free-hanging portion. In another example, the wicking fiber bundle may be wrapped a first time (or several times) around the bottom of the heating body 102, passed underneath the coils and continue to be coiled up to the top where it can be tied to itself. The wicking fiber bundle can also be tied off against other elements of the smoke machine 100, such as the conduits 68 and/or 90.

When coiling the wicking fiber bundle, a certain tension is applied to create a pressure against said heating body 102. In general, pressure is imparted by the liquid transfer device 44 onto the heating body 102, the liquid transfer device being compressed against the heating body 102. The pressure creates friction between the liquid transfer device 44 and the heating element 46, particularly here the heating body 102, that holds the liquid transfer device in place and keeps it in contact with the heating body 102.

In the illustrated example, it is the first portion 104 of the liquid transfer element 44 that is in contact with the heating body 102. Now when generating pressure upon the heating body, it is preferable that the pressure provided fully presses the first portion 104 against the heating body 102, however if too much pressure is applied to a wicking device, this may compress the capillary passages to the point of inhibiting or completely preventing wicking. Indeed wicking devices rely on the presence of small passages, typically spaces between fibers to wick liquids. If the device is too compressed, for example if the wicking fiber bundle of the example of FIG. 1A is wound too tightly, the inter-fiber spaces may be reduced to the point of no longer wicking properly or at all. Therefore, the pressure applied is selected to be between a minimum pressure to press the first portion 104 against the heating body 102 (preferably firmly so as to effect a friction fit) and a minimum pressure that compresses the capillary passages within the first portion 104 to the point of preventing, or preferably significantly inhibiting, wicking.

In order to achieve such a pressure, the wicking fiber bundle may be wrapped as loosely as will still allow a firm friction hold against the heating body 102. The level of tightness required may be ascertained coiling it as loosely as possible and feeling whether proper purchase is achieved, tightening the coil if necessary. In order to ensure that the coil does not exceed a minimum pressure to prevent, or significantly inhibit wicking, a liquid may then be introduced to the second portion 106 and wicking effect is observed. It is helpful to provide a colored liquid of viscosity similar to that which is used in the smoke machine 10 to visually observe wicking while providing in-machine conditions. Once the proper level of pressure, in this case fiber bundle tension, is ascertained, it may be used for all smoke machines.

It will be appreciated that installation and replacement of the liquid transfer device 44 of the above example does not require special tools or abilities, but can be performed by unskilled workers in short time. In particular, a spent wick may be untied or cut off and a new one may be installed as described above. If the appropriate coiling tension has already been discovered, the wicking testing may be avoided.

The liquid transfer device 44 may be other forms of wicks, similarly coiled or wrapped around the heating body 102.

Although in the example provided in FIG. 1A, the wicking fiber bundle was tied in place, other mechanisms for holding the liquid transfer device 44 may be used. In particular, a fastener may be used to hold the liquid transfer device 44 in friction fit.

Although in the above examples, the heating element 46 was a ceramic heating element, different types of heating elements 46 are also possible and may be used in combination with the liquid transfer device 44 to heat the smoke producing liquid on the liquid transfer device 44. For example, in a variant implementation, the heating element 46 is a coil of resistive wire that generates heat when an electrical current is conducted therethrough, normally by placing an electrical voltage across the wire. In this case, the liquid transfer device 44 may surround the outside of the wire coil. A reflective inner tube may be provided inside the wire coil to reflect radiation from the coil back outside towards the liquid transfer device 44. Thus the wire may heat the smoke producing liquid on the upper portion of the liquid transfer device 44 in order to generate the smoke.

Also, it should be noted that liquid transfer devices other than those of the above examples may be used. Different materials or combinations of materials, characterized by similar thermal insulation and capillary action, may also be used for the liquid transfer device 44. More specifically, the liquid transfer device 44 may be any other suitable device which can adequately convey liquid from the liquid reservoir 36 to the heating element 46 primarily by capillary action.

The liquid transfer device 44 must be able to withstand very high temperatures while also producing enough capillary action to convey the liquid from the liquid reservoir 36 to the heating element 46. In a specific, non-limiting example of the implementation, the liquid transfer device 44 is a woven wick or wicking fibers, made for example of fibreglass which can withstand very high temperatures and, in this example, is an excellent thermal insulator. The wick or wicking fibers can convey an adequate amount of liquid by capillary action to the electrically-powered heating element to produce an ample amount of smoke.

Alternatively, different materials or combinations of materials, characterized by similar thermal insulation and capillary action, may also be used for the liquid transfer device 44. More specifically, the liquid transfer device 44 may be any other suitable device, which can adequately convey liquid from the liquid reservoir 36 to the heating element 46 primarily by capillary action.

In the example of implementation shown in FIG. 1A, a heating body 102 heats up in response to the application of an electrical current at the electric terminals 45. In this example, the heating element 46 is a ceramic heating element. An upper portion of the liquid transfer device 44 closely surrounds, or is wound around, the heater material, such that when the heating element 46 is energized and heated, the smoke producing liquid on the upper portion of the liquid transfer device 44 will be vaporized into smoke within the chamber 20.

A ceramic heating element 46 is a composite ceramic material that can have iron or steel flakes as a conductive filler, as is known in the art of ceramic heating elements (any suitable conductive filler can be used). Alternatively, an electrical resistive heater element core can be surrounded by ceramic material, wherein the ceramic material transmits the heat from the resistive heater element and provides a high temperature on the surface of the heating element for vaporizing the smoke producing liquid. The ceramic heating element 46 has no exposed metal conductor that can corrode and thus it can provide a longer working life. Also, when the liquid transfer device 44, such as a wick, needs to be changed, the integrity of the heater 46 is not adversely affected.

The terminals 45 are schematically illustrated in the drawings as passing through the top 14. While not illustrated, insulated terminal blocks can be provided in the top 14 or housing 16, such as in the removable lid or top portion 14, so that terminals 45 can be affixed to the terminal blocks. Alternatively, an electrical connector can be provided in the housing 16 or in the lid or top portion 14 to allow the terminals 45 to be affixed or plugged into the electrical connector. This can provide mechanical support for the heater 102 in addition to electrical connectivity. It will be appreciated that the heater 102 can be arranged horizontally within the housing 16 in addition to the vertical arrangement illustrated.

Note however that different types of heating elements 46 are also possible and may be used in combination with the liquid transfer device 44 to heat the smoke producing liquid on the liquid transfer device 44. In this case, the wire is coiled closely around the upper portion of the liquid transfer device 44, such as to heat the smoke producing liquid on the upper portion of the liquid transfer device 44 in order to generate the smoke.

In a specific, non-limiting example of implementation, the heating element 46 is electrically connected to a power supply of the smoke machine 10, either directly or via a control unit of the smoke machine 10. In the examples shown in FIGS. 1, 2, 3 and 4, a pair of terminals 45 are provided on the top cover 14, extending therethrough to connect to a pair of electrical inputs on the heating element 46. In order to power the smoke machine 10, the terminals 45 are electrically connectable to a power supply 47, such as a battery, a transformer or an electrical outlet, for example via extension cables.

A liquid transfer device 44, described in more details below, transfers liquid from the liquid reservoir 36 towards the heating element 46.

In the present example, the smoke machine 10 is configured to provide heat to the heating body 105 that favors the creation of smoke as described above while avoiding the creation of toxic fumes and the over pressurization of the chamber 20. In one example, the heater power supply 47 provides a current to the heating element 46 that results in the heating of the heating element 46 to a controlled temperature sufficient to create evaporation of the smoke-producing liquid while avoiding the combustion of the smoke-producing liquid and of the liquid transfer device 44 and the boiling of the liquid in the liquid reservoir 36. To this end, the heater power supply 47 is controlled to provide an electrical current that maintains the heating element 46 in a state of generating heat that is within such a safe range. In one particular example of implementation, the heater power supply 47 provides a constant voltage that generates current in the heating element 46 that allows the heating body 102 to heat to a temperature at which the liquid evaporates but which does not cause dangerous combustion or pressure buildup.

To this end, the current provided, heating element 46 and liquid are selected in light of one another. In one particular example, mineral oil is used which generates evaporate smoke at about 300 degrees Celsius. A ceramic heating element is selected and supplied with a power which according to its specification creates a temperature in the heating body 102 of about 300 degrees.

In order to vaporize the liquid, the liquid is transferred to the surface of the heating body 102 by the liquid transfer device 44 such that when the heating element 46 is energized and heated, the smoke producing liquid provided by the liquid transfer device 44 will be vaporized into smoke within the chamber 20. The liquid transfer device 44 may be affixed to the heating element 46, and more particularly to the heating body 102 by friction fit, as is the case in the illustrated examples.

The smoke machine 10 includes a control unit, which may be configured to implement various different functionalities, including for example measuring the temperature of the heating element 46; setting one or more indicators (e.g. turning on and off one or more indicator lights); detecting the polarity of and turning on and off the power to the heating element 46 based on temperature and/or cycle-time criteria; detecting activation of a control, the latter being either provided on the housing 12 or in wireless communication with the control unit of the machine 10; setting or adjusting a set-point of a solenoid valve; controlling and/or setting an electronic pressure regulator; controlling the operation of one or more remote sources of pressurized air; turning on and off auditory signals; implementing a fail safe mode; etc.

The control unit of the smoke machine 10 may be implemented in hardware, software or a combination thereof, either locally to the smoke machine 10, remotely from the smoke machine 10 or both locally and remotely. In a specific, non-limiting example of implementation, the control unit of the smoke machine 10 is fully implemented within the machine 10 itself, by a printed circuit board having a power switch, where this power switch is operably coupled to a manually activatable on/off button or switch 48 located on the housing 12, for example on the top cover 14. In another non-limiting example of implementation, the control unit of the machine 10 includes both a printed circuit board within the smoke machine 10 and a remote controller in wireless communication with the printed circuit board, where this remote controller implements a plurality of controls (including for example an on/off control 48) that are activatable by a user of the remote controller to transmit wireless control signals to the circuit board for controlling the operation of the smoke machine 10.

The control unit of the smoke machine 10 includes a pressure controller 80 that is responsive to the activation by a user of an operating mode selector control 82 to switch the machine 10 between first and second pressure operating modes. More specifically, the pressure controller 80 is responsive to activation of the operating mode selector control 82 to switch the smoke machine operation from the first pressure operating mode to the second pressure operating mode, or vice versa, thereby varying (or changing) the operating pressure (i.e. the pressure at which vapor is generated by the smoke machine 10) from a first predefined test pressure to a second predefined test pressure, or vice versa, as will be discussed in further detail below.

Note that the operating mode selector control 82 may be implemented as a button or a switch on the housing 12 itself (e.g. on the top cover 14), in which case activation of this operating mode selector control may involve manual depression of a button or flipping of a switch. Alternatively, the operating mode selector control 82 may be implemented by a remote controller (e.g. within an application running on a smartphone), in wireless communication (e.g. using Bluetooth® wireless technology) with the pressure controller of the machine 10.

In a specific, non-limiting example of implementation, the first pressure operating mode is a LO pressure operating mode, in which the smoke machine 10 generates vapor at a low test pressure, for example between 0.47 psi and 4 psi, although a pressure between 1 psi and 2 psi (about 1.5 psi) is commonly suitable. The second pressure operating mode is a HI pressure operating mode, in which the smoke machine 10 generates vapor at a high test pressure, for example between 5 psi and 15 psi, although about 7.5 psi is commonly suitable.

Note that the smoke machine 10 may be configured to operate in a plurality of distinct pressure operating modes and two or more controls may be provided (either wireless or on the housing 12 itself) for selecting a specific one of these pressure operating modes or for switching between the different pressure operating modes. Furthermore, the different pressure operating modes of the smoke machine 10 may be characterized by various different operating pressures and/or pressure ranges, including lower than 0.47 psi and higher than 15 psi, without departing from the scope of the present invention.

Controlling the pressure of the air output from the smoke machine 10 is a question of safety of the vehicle. Most passenger vehicles can be tested safely below 2 psi, and turbo charged vehicles can use pressures between 5 and 15 psi for some testing. However, certain models of heavy duty trucks can be safely tested using pressures up to 100 psi. As can be appreciated, the ability to switch pressure level is not limited to only two levels. The safety feature of returning to a safe level of pressure can be used with various pressure levels. For example for a model of the smoke machine 10 for heavy duty trucks, the default low level could be limited to 60 psi, while the higher level that can be selected, for example for brake booster testing, can be limited to 100 psi.

The control unit, and thus the pressure controller 80, of the smoke machine 10 is operably coupled to at least one operation mode indicator 86 (e.g. an indicator light or an auditory indicator). In a specific, non-limiting example of an implementation, the control unit is operably coupled to a plurality of operation mode indicators 86, implemented on the housing 12 of the machine 10 itself and/or at the remote controller (e.g. within an application running on a smartphone). In the case of indicator lights 86 on the housing 12 of the machine 10, these lights may be of different colours (e.g. red, green, blue, etc.) and may be lit (or extinguished) by the control unit to indicate various conditions of the operation of the smoke machine 10, including for example: that a power source 47 is successfully connected to the smoke machine 10; that the on/off control 48 has been actuated to turn on the smoke machine 10; that the smoke machine 10 is in a particular pressure operating mode (e.g. LO or HI); etc.

The control unit of the smoke machine 10 may control the power being supplied to the heating element 46. In a specific, non-limiting example of implementation, the control unit may be programmed to energize the heating element 46 when the temperature of the heating element 46 is below a specified temperature and to de-energize the heating element 46 when the temperature of the heating element 46 exceeds a specified temperature. This cycle may continue for as long as the smoke machine 10 is being used to produce smoke.

In order to convey the smoke produced by the smoke machine 10 into a fluid system to check for leaks, a source 84 of pressurized gas is supplied to the chamber 20 through a pressurized gas fluid path. The fluid path begins at an outlet of the source 84 of pressurized gas (such as a pump or an air compressor), which outlet is connected to inlet port 62 on the housing 12, either directly or via a suitable conduit. Optionally, a flow meter may be secured to the housing 12, the fluid path connecting the outlet of the source 84 to the inlet port of this flow meter, where this flow meter may be a simple graduated floating ball flow meter, an electronic flow meter electrically connected to the control unit, or some other type of meter capable of measuring fluid flow rates. As seen in FIG. 1A, a conduit 68 extends from the inlet port 62 (or optionally from an outlet port of a flow meter) through a hole in the top cover 14 and down into the chamber 20 through an opening 110 in the conduit, to feed the pressurized gas into the chamber 20 of the smoke machine 10.

In a specific, non-limiting example of implementation of the present invention, the pressurized gas fluid path of the smoke machine 10 can include a pressure regulator, the latter being connected to the source 84 of pressurized gas and operably coupled to and powered/whether mechanical or electronically controlled to control the pressure controller 80. The pressure regulator may be provided within or on the housing 12 of the machine 10 itself or, alternatively, may be provided remote from the machine 10, for example connected to the outlet of the source 84 of pressurized gas and interfacing between this outlet and the inlet port 62 of the machine 10. In the case where the pressure regulator is implemented within the housing 12 of the machine 10, the conduit 68 connects to an inlet of the pressure regulator, outlet of which feeds directly (or alternatively, via other flow control components, such as a flow valve and/or a pressurized gas flow regulator) into the chamber 20 of the smoke machine 10. The pressure controller 80 is responsive to user-activation of the operating mode selector control 82 to electrically set and/or adjust the set-point of the controllable pressure regulator such that it reduces the incoming gas pressure to the desired pressure. In a specific, non-limiting example, the pressure controller 80 will switch the set-point of the controllable pressure regulator between 1.5 psi (LO) and 7.5 psi (HI), depending on the pressure operating mode selected by the user.

An outlet port 96 on the housing 12 outputs smoke received from a smoke outlet conduit 90, the latter extending from the outlet port 96 through a hole in the top cover 14 and down through an opening 112 into the smoke-generating chamber 20. The outlet port 96 is adapted to be coupled to a duct or channel, either directly or via a suitable connector, where this duct or channel is used to convey smoke from the smoke machine 10 to the fluid system being leak checked.

The operation of the smoke machine 10 to detect a leak in a fluid system having a particular inspection pressure requirement is as follows. A supply of pressurized gas from a pressure source 84, such as an air compressor or a pump, is connected to the inlet port 62, whereby this pressurized gas can be supplied to the chamber 20 and its pressure set by the pressure regulator that is provided along the pressurized gas fluid path. The terminals 45 are connected to a power source 47, such as a 12-volt automobile battery. The outlet port 96 is connected via a suitable duct or channel to the fluid system to be leak checked, with or without an adapter (the fluid system possibly requiring one or more plugs to be installed in order to close the system so that it can hold pressure). The pressure regulator 80 controls a pressure setting of the pressure regulator to set the smoke machine 10 in a default pressure operating mode (e.g. LO), and will switch the smoke machine 10 into a different predefined pressure operating mode (e.g. HI), by adjusting the setting of the pressure regulator accordingly, when a user activates the respective operating mode selector control 82 depending on the inspection pressure requirement of the fluid system to be checked. Therefore, if the fluid system to be checked is a naturally aspirated internal combustion engine of an automobile, for example, the user would leave the smoke machine 10 in the default LO pressure operating mode; however, if the fluid system to be checked is the boosted (i.e. turbo) engine, the user could simply activate the control 82 (e.g. press the button 82 on the machine 10 or activate the control 82 on a remote controller) to switch the smoke machine 10 from the LO pressure operating mode to the HI pressure operating mode, by adjusting the setting of the controllable pressure regulator accordingly.

Once the smoke machine 10 is properly set-up and connected to the fluid system, the pressure gauge may be checked to ensure that the proper pressure of compressed air is being supplied. With the smoke machine 10 in either the "on" mode in which it is producing smoke, or in the "off" mode in which it is not producing smoke, several different types of known leak tests may be performed with the smoke machine 10 to determine whether there is a leak in the fluid system.

To determine the location of a leak in the fluid system, the smoke machine 10 must be turned on. The on/off control 48 is activated to turn on the smoke machine 10. The control unit then energizes the heating element 46 and turns on the respective indicator light. The control unit will energize the heating element 46 by any suitable process. The heating element 46 vaporizes the liquid on the liquid transfer device 44, which is in the vicinity of the heating element 46, thereby producing smoke. The smoke is conveyed into the fluid system (for example, at the pressure set by the pressure controller 80 in accordance with the user-selected pressure operating mode) and the user then inspects the fluid system for any escaping smoke.

In addition to lighting or extinguishing operating mode indicator lights 86 in order to indicate the various conditions of the operation of the smoke machine 10 (as discussed above), the control unit may optionally implement an auditory indicator, for example auditory signals transmitted via a speaker provided on the top cover 14 of the machine 10 or via the speaker of a smartphone being used as a remote controller, in order to advise the user of various operating conditions of the smoke machine 10. In a specific, non-limiting example, the pressure controller 80 of the control unit triggers the output of a series of warning beeps when the smoke machine 10 is switched into a specific pressure operating mode (e.g. the HI pressure operating mode) to ensure that the user is aware that the smoke machine 10 has acquired and will be operating at the respective test pressure.

Optionally, the control unit is also operative to implement a fail safe mode, for automatically resetting the machine 10 to a predefined, default pressure operating mode. In a specific, non-limiting example of implementation, the pressure controller 80 triggers this operating mode reset 88 when the smoke machine 10 is powered down and then back up, by electrically or wirelessly controlling the setting of the controllable pressure regulator to set the smoke machine 10 in a safe, predefined default pressure. In a specific non-limiting example, the default pressure operating mode is the LO pressure operating mode. In a variant example of implementation, the pressure controller 80 triggers the failsafe mode in response to a signal from a pressure sensor in communication with the hose or channel connected to the fluid system, for example when this pressure sensor indicates a significant drop in pressure (e.g. when the hose or channel is disconnected from the fluid system being tested).

Figure 1B:
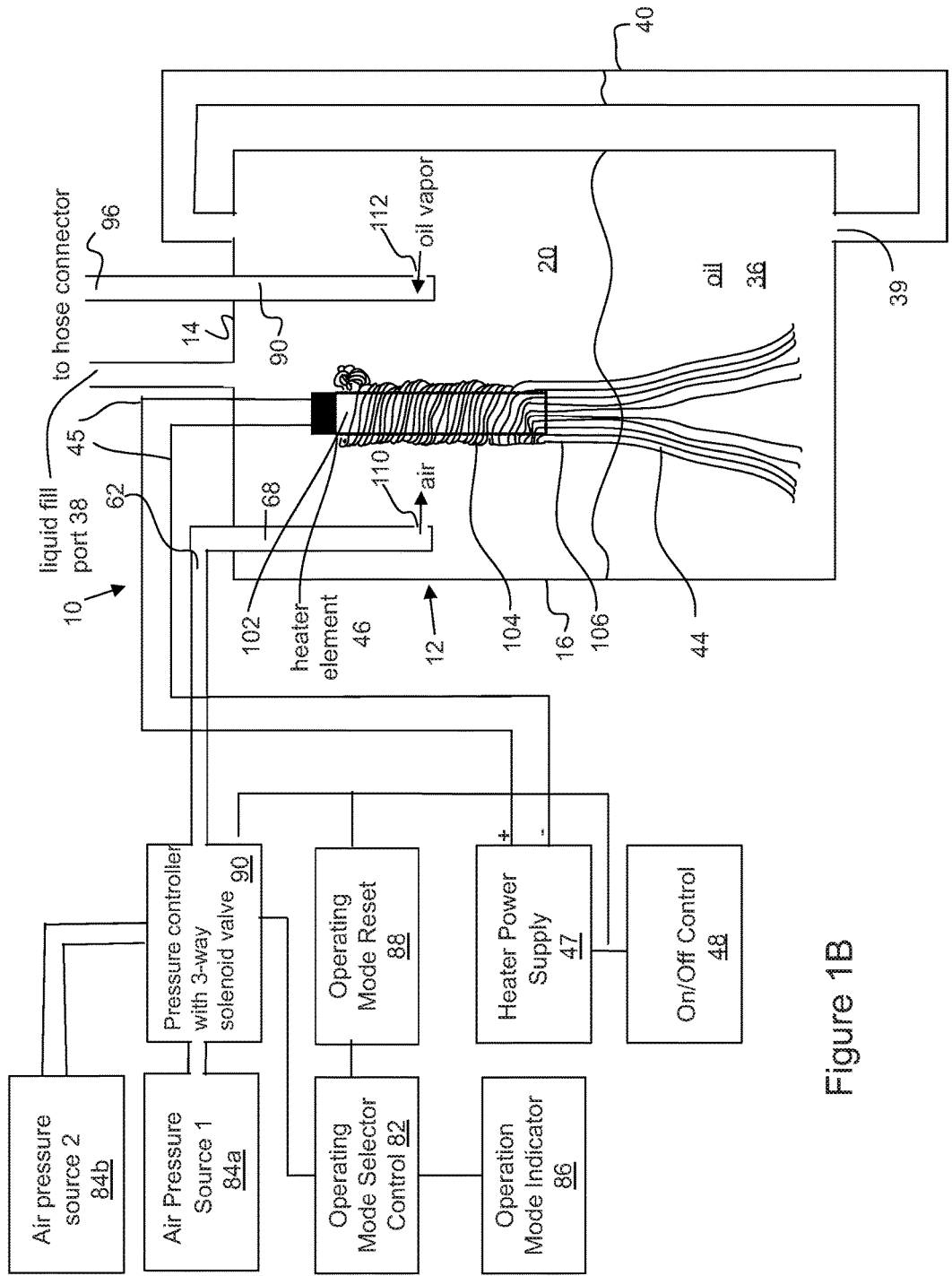
FIG. 1B is a schematic view of an exemplary variable pressure smoke machine with a liquid transfer device surrounding a heating element connected to two air pressure sources in accordance with the teachings of the present invention.

FIG. 1B introduces a variant embodiment, wherein the smoke machine 10 is in fluid communication with a pair of constant sources of pressurized gas 84a and 84b (e.g. a pair of pumps with respective integrated pressure regulators) and the pressure controller with three-way solenoid valve 90 controls which of these sources supplies the pressurized gas to the chamber 20 via the pressurized gas fluid path. In this case, the fluid path of the smoke machine 10 passes through one of the inlet ports of a controllable, three-way solenoid valve of the pressure controller 90, each of which inlet ports is connected to the pressure regulator of a respective one of the air pressure source 1 84a and air pressure source 2 84b, either directly or via a suitable fluid conduit. The solenoid valve of the pressure controller 90 may be mounted to the top cover 14, for example by a bracket. The outlet from the controllable solenoid valve of the pressure controller 90 is connected to the inlet port 62 (or to an inlet port of a flow meter that may also be mounted to the top cover 14). Since the pressurized gas received at the smoke machine 10 from either the air pressure source 1 84a or the air pressure source 2 84b is of constant pressure (i.e. regulated by the respective pressure regulators of the sources), there is no need for an additional controllable pressure regulator within the smoke machine 10 itself or at some other point in the fluid path of the smoke machine 10. In a specific, non-limiting example, the pressure regulator of the first source 84a is set to regulate the pressure of the gas output from the first source 84a to a constant 1.5 psi (e.g. LO pressure), while the pressure regulator of the second source 84b is set to regulate the pressure of the gas output from the second source 84b to a constant 7.5 psi (e.g. HI pressure).

The solenoid valve of the pressure controller 90, which is an electromechanically operated, bi-directional 3-way valve, is operably coupled to its pressure controller, and has a set-point that determines switching of the inflow between its two inlet ports. On a basis of this set-point, the pressure controller controls the operation of the solenoid valve, and thus the flow of the incoming pressurized gas from either the air pressure source 1 84a or the air pressure source 2 84b, in order to set the operation of the smoke machine 10 in either the first or second pressure operating mode.

In another variant embodiment, the source of pressurized gas (e.g. pump or air compressor) that supplies pressurized gas to the smoke machine 10 is operably coupled to the pressure controller 80 of the smoke machine 10, such that the pressure controller 80 has control over the operation of the source of pressurized gas. In a specific, non-limiting example, the source of pressurized gas (or an electronic pressure regulator of the source) can be set by the pressure controller 80 to output the pressurized gas to the inlet port 62 of the smoke machine 10 at any one of a plurality of different constant pressure levels, in order to set the operation of the smoke machine 10 in a specific one of a plurality of different pressure operating modes. Since the pressurized gas received at the smoke machine 10 from the source is of constant pressure (e.g. regulated by an electronic pressure regulator at the source), there is no need for a pressure regulator within the smoke machine 10 itself. The source of pressurized gas, and/or its electronic pressure regulator, may also be set, either at initial setup or by the pressure controller 80 during operation, to control the flow rate of the pressurized gas output to the smoke machine 10, in which case there is no need for any flow valve and/or pressurized gas flow regulator within the smoke machine 10.

Note that, in a specific non-limiting example of implementation, a wireless remote control technology allows the pressure controller 80 to control the pressure setting of the remote source of pressurized gas. More specifically, a transceiver at the pressure controller 80 and a receiver at the source of pressurized gas (or at its electronic pressure regulator) communicate via a wireless communication protocol (e.g. radio (RF), wireless broadband internet (WLAN, WiFi), cellular, infrared, ultrasonic, etc.).

Note also that, in the case where the source of pressurized air is designed such that its speed of operation is proportional to the pressure of the output gas, it would be possible for the pressure controller 80 to simply set and/or adjust this speed of operation of the source in order to set and/or adjust the pressure of the gas output to the inlet port 62 of the smoke machine 10, and thereby set the operation of the smoke machine 10 in a specific one of a plurality of different pressure operating modes.

Accordingly, in this particular variant example of implementation, it is direct control over the remote source of pressurized gas that allows the pressure controller 80 to control and switch the particular pressure operating mode of the smoke machine 10.

In yet another variant example of implementation of the present invention, the smoke machine 10 is in fluid communication with a high pressure gas source 84 (e.g. a pump or air compressor) and the pressurized gas fluid path within the housing 12 of the smoke machine 10 includes a pair of three-way solenoid valves and a pair of mechanical pressure regulators, which together replace the operation of the controllable pressure regulator discussed above. More specifically, in this example of implementation, the conduit 68 extends from the inlet port 62 (or optionally from an outlet port of a flow meter) down into the chamber 20 and connects to an inlet of a first three-way (or three-port) solenoid valve. Each outlet of the first solenoid valve is connected to a respective mechanical pressure regulator, the outlets of which are both connected to a second three-way solenoid valve. The outlet of the second three-way solenoid valve is connected to a flow valve, which optionally has a control knob that extends through a hole in the side of the main body 16 so that the flow valve may be adjusted during the operation of the smoke machine 10. Alternatively, the flow valve may be an electronic valve which is connected to, and controlled by, the pressure controller 80.

Each of the mechanical pressure regulators may be set to reduce the incoming gas pressure to a respective, desired pressure. In a specific, non-limiting example, the first pressure regulator is set to reduce the incoming gas pressure to a LO test pressure within the range of 0.47 psi to 4 psi, while the second pressure regulator is set to reduce the incoming gas pressure to a HI test pressure within the range of 5 to 15 psi.

Each of the solenoid valves, which are electromechanically operated, bi-directional 3-way valves, are operably coupled to the pressure controller 80, and have a respective set-point that determines switching of the outflow (or inflow) between the two outlet ports (or inlet ports). On a basis of these set-points, the pressure controller 80 electrically controls the operation of each solenoid valve, and thus the flow of the incoming pressurized gas to/from one or the other of the pre-set pressure regulators, in order to set the operation of the smoke machine 10 in either the first or second pressure operating mode.

Optionally, in any or all of the different embodiments described above, a safety mechanism is built into certain components of the smoke machine 10, its pressurized gas fluid path or its source(s) of pressurized gas, in order to ensure that a maximum operating pressure of the smoke machine 10 is not exceeded (which could lead to damage of the fluid system being checked for leaks). In one non-limiting example of implementation, safety check valves (also referred to as safety valves, relief valves, pressure relief valves or pressure safety valves), which particular type of valve is well known in the art, are used to prevent the pressure within the pressurized gas fluid path of the smoke machine 10, and/or at the discharge of the source(s) of pressurized gas, from exceeding preset limits. Such a safety check valve may be used in any one of a source of pressurized gas (e.g. a pump or air compressor), a pressure regulator (mechanical or electronic, either at the source of pressurized gas or within the smoke machine) or a conduit or line (connecting the source and the smoke machine or within the smoke machine itself), as well as in other components of the vapor generating system. For example, a safety check valve of a pressure regulator may be set to blow (or open) at a pressure of 16 psi. In another example, a safety check valve of a pump may be designed to be damaged at 20 psi.

In another non-limiting example of implementation of a safety mechanism for the smoke machine 10, the source(s) of pressurized gas (e.g. pump(s) or air compressor(s)) that are in fluid communication with the smoke machine 10 are designed or built such that they cannot exceed a predefined pressure rating, thereby ensuring that the pressurized gas pumping into the smoke machine 10 does not exceed maximum pressure limits of the smoke machine 10 or of the fluid system(s) being checked.

Figure 2:
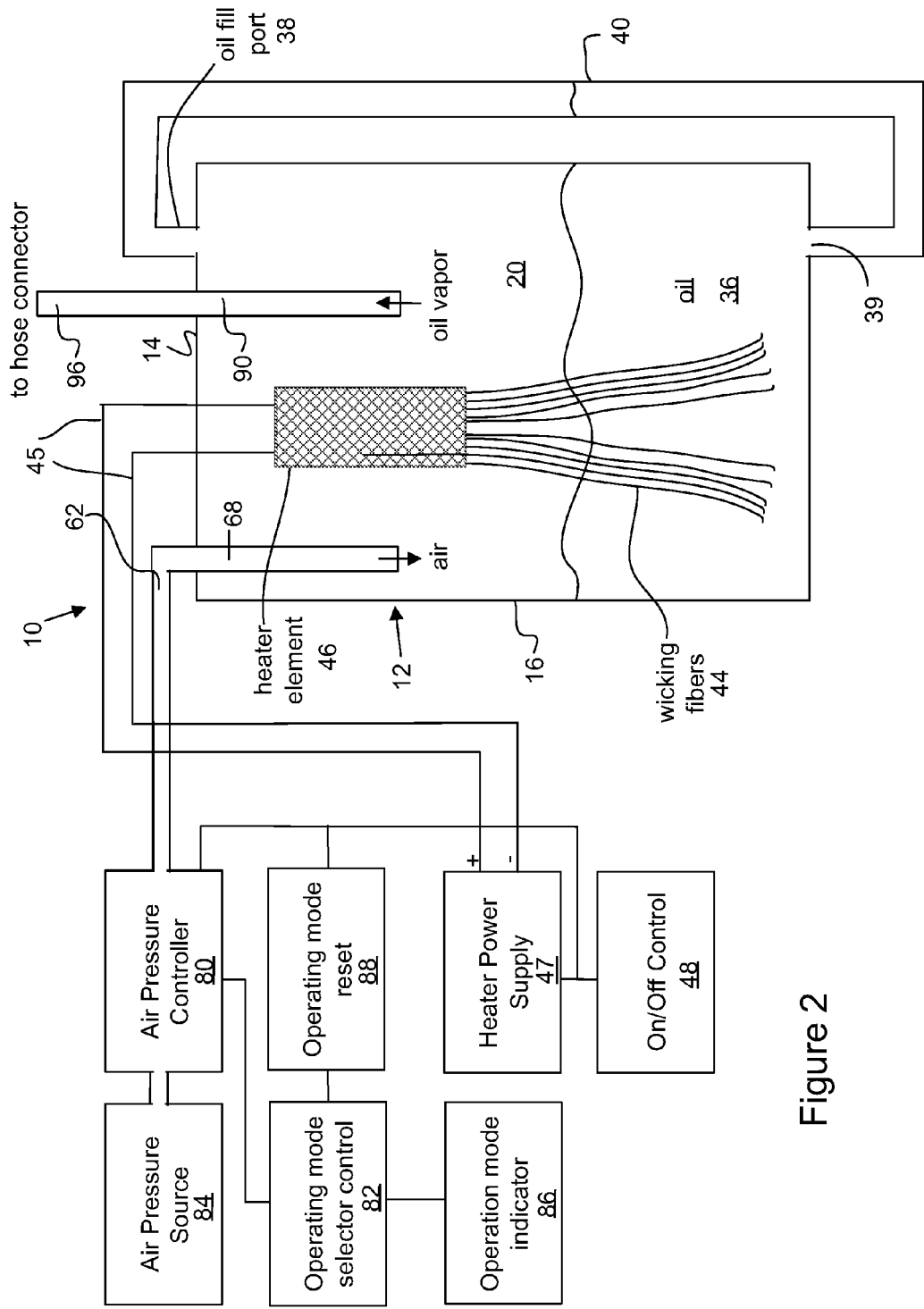
FIG. 2 is a schematic view of an exemplary variable pressure smoke machine, in accordance with the teachings of the present invention.
Figure 3:
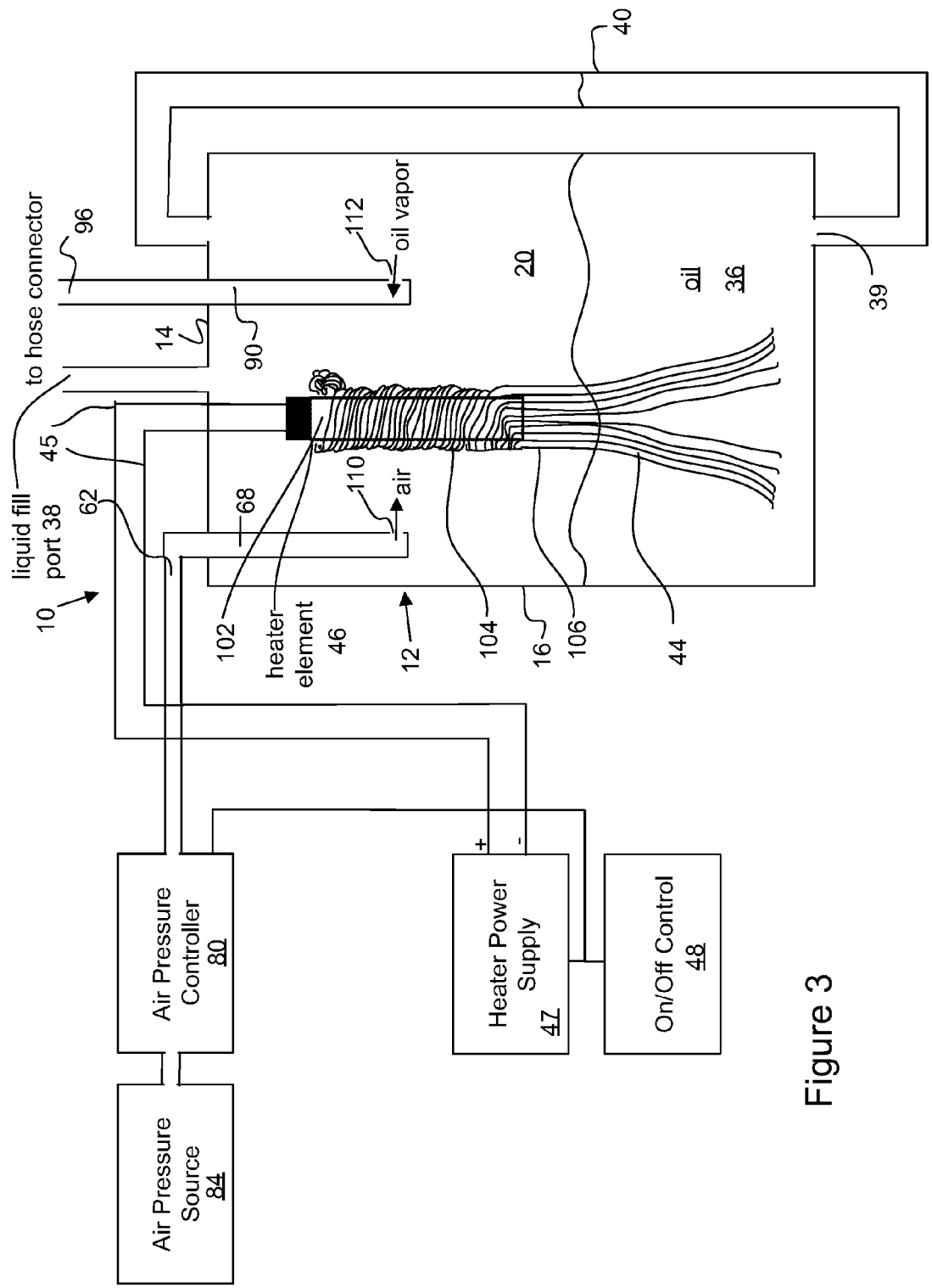
FIG. 3 is a schematic view of an exemplary smoke machine with a liquid transfer device surrounding a heating element in accordance with the teachings of the present invention.
Figure 4:
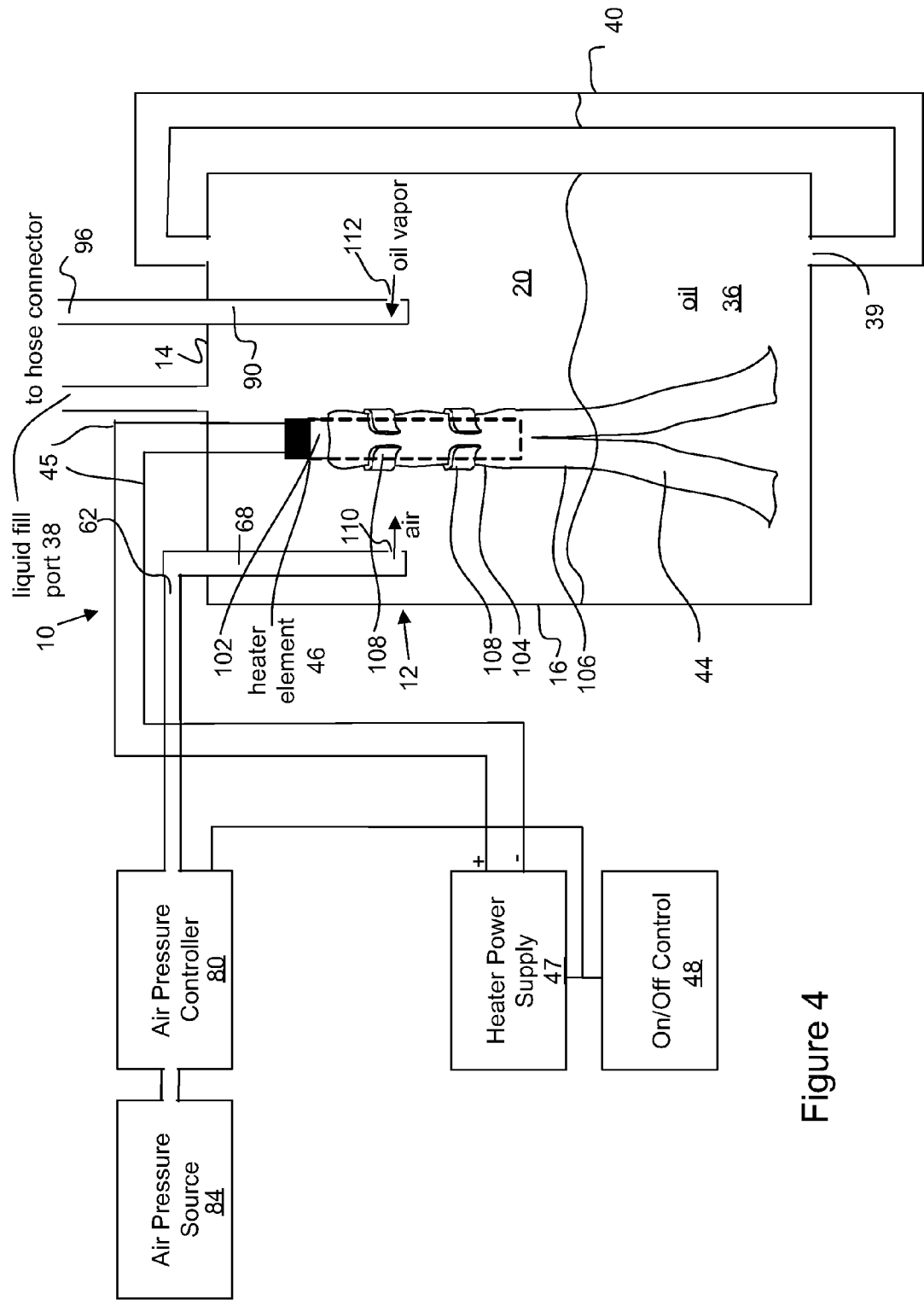
FIG. 4 is a schematic view of another exemplary smoke machine with a liquid transfer device surrounding a heating element in accordance with the teachings of the present invention.

The smoke machine 10 may comprise both a variable pressure system and a liquid transfer device surrounding a heating element as shown in FIG. 1A. Alternatively, the smoke machine 10 may comprise a variable pressure system without a liquid transfer device surrounding a heating element as shown in FIG. 2. In alternative embodiments, the smoke machine 10 may comprise a liquid transfer device surrounding a heating element without a variable pressure system as shown in FIGS. 3 and 4. The features, as provided herein, of the smoke machine 10 having both a variable pressure system and a liquid transfer device surrounding a heating element may be applicable, with the necessary adaptations, to a smoke machine 10 with a liquid transfer device surrounding a heating element and without a variable pressure system, and vice-versa. Likewise, the features of the smoke machine 10 having both a variable pressure system and a liquid transfer device surrounding a heating element, as provided herein, may be applicable, with the necessary adaptations, to a smoke machine 10 with a variable pressure system and without a liquid transfer device surrounding a heating element, and vice-versa.

Reference will now be made to FIG. 2, illustrating an exemplary embodiment of a variable pressure smoke machine 10 without a liquid transfer device surrounding a heating element in accordance with the teachings of the present invention. The smoke machine 10 has a housing 12 having a top cover 14 and a main body 16, which provide a smoke generating chamber 20. The top cover or lid 14 can be removable for maintenance or for filling the reservoir (a separate fill hole and cap can be provided for filling if desired). A hook (not shown) may be attached to the top cover 14 of the housing 12 for hanging the smoke machine 10 in a convenient location when the smoke machine 10 is being used to test the integrity of a fluid system, for example under the hood of an automobile.

The main body 16 is preferably a machined aluminum component, but may be manufactured by any other suitable process. The main body 16 defines a liquid reservoir 36 within the chamber 20 for holding smoke producing liquid. In order to fill the liquid reservoir 36 with smoke producing liquid, a liquid fill port 38 is optionally provided in the top cover 14, via which port 38 liquid may be poured into the liquid reservoir 36 of the chamber 20. In this example, the liquid fill port is provided on a tubular extension of the top cover 14 and can be sealed shut using a screw-on cap (not shown). Alternatively, in the absence of a liquid fill port 38, the top cover 14 of the housing 12 may simply be removed to allow liquid to be poured into the liquid reservoir 36.

Note that the material of the liquid reservoir 36 is that of the housing 12, e.g. aluminium. However, in a variant embodiment, a liner or insert of any other suitable material which is compatible with the particular smoke producing liquid(s) being used may be provided within the liquid reservoir 36 to contain the liquid.

A heating body 102 heats up in response to the application of an electrical current at the electric terminals 45. In this example, the heating element 46 is a heating element which generates heat when an electrical current is conducted therethrough. An upper portion of the liquid transfer device 44 closely surrounds, or is wound around, the heater material, such that when the heating element 46 is energized and heated, the smoke producing liquid on the upper portion of the liquid transfer device 44 will be vaporized into smoke within the chamber 20.

Note however that different types of heating elements 46 are also possible and may be used in combination with the liquid transfer device 44 to heat the smoke producing liquid on the liquid transfer device 44. For example, in a variant implementation, the heating element 46 is a coil of resistive wire that generates heat when an electrical current is conducted therethrough, normally by placing an electrical voltage across the wire. In this case, the wire is coiled closely around the upper portion of the liquid transfer device 44, such as to heat the smoke producing liquid on the upper portion of the liquid transfer device 44 in order to generate the smoke.

The smoke machine 10 includes a control unit, which may be configured to implement various different functionalities, including for example measuring the temperature of the heating element 46; setting one or more indicators (e.g. turning on and off one or more indicator lights); detecting the polarity of and turning on and off the power to the heating element 46 based on temperature and/or cycle-time criteria; detecting activation of a control, the latter being either provided on the housing 12 or in wireless communication with the control unit of the machine 10; setting or adjusting a set-point of a solenoid valve; controlling and/or setting an electronic pressure regulator; controlling the operation of one or more remote sources of pressurized air; turning on and off auditory signals; implementing a failsafe mode; etc.

The control unit of the smoke machine 10 may be implemented in hardware, software or a combination thereof, either locally to the smoke machine 10, remotely from the smoke machine 10 or both locally and remotely. In a specific, non-limiting example of implementation, the control unit of the smoke machine 10 is fully implemented within the machine 10 itself, by a printed circuit board having a power switch, where this power switch is operably coupled to a manually activatable on/off button or switch 48 located on the housing 12, for example on the top cover 14. In another non-limiting example of implementation, the control unit of the machine 10 includes both a printed circuit board within the smoke machine 10 and a remote controller in wireless communication with the printed circuit board, where this remote controller implements a plurality of controls (including for example an on/off control 48) that are activatable by a user of the remote controller to transmit wireless control signals to the circuit board for controlling the operation of the smoke machine 10.

Specific to the present invention, the control unit of the smoke machine 10 includes a pressure controller 80 that is responsive to the activation by a user of an operating mode selector control 82 to switch the machine 10 between first and second pressure operating modes. More specifically, the pressure controller 80 is responsive to activation of the operating mode selector control 82 to switch the smoke machine operation from the first pressure operating mode to the second pressure operating mode, or vice versa, thereby varying (or changing) the operating pressure (i.e. the pressure at which vapor is generated by the smoke machine 10) from a first predefined test pressure to a second predefined test pressure, or vice versa, as will be discussed in further detail below.

Note that the operating mode selector control 82 may be implemented as a button or a switch on the housing 12 itself (e.g. on the top cover 14), in which case activation of this operating mode selector control may involve manual depression of a button or flipping of a switch. Alternatively, the operating mode selector control 82 may be implemented by a remote controller (e.g. within an application running on a smartphone), in wireless communication (e.g. using Bluetooth® wireless technology) with the pressure controller of the machine 10.

In a specific, non-limiting example of implementation, the first pressure operating mode is a LO pressure operating mode, in which the smoke machine 10 generates vapor at a low test pressure, for example between 0.47 psi and 4 psi, although a pressure between 1 psi and 2 psi (about 1.5 psi) is commonly suitable. The second pressure operating mode is a HI pressure operating mode, in which the smoke machine 10 generates vapor at a high test pressure, for example between 5 psi and 15 psi, although about 7.5 psi is commonly suitable.

Note that the smoke machine 10 may be configured to operate in a plurality of distinct pressure operating modes and two or more controls may be provided (either wireless or on the housing 12 itself) for selecting a specific one of these pressure operating modes or for switching between the different pressure operating modes. Furthermore, the different pressure operating modes of the smoke machine 10 may be characterized by various different operating pressures and/or pressure ranges, including lower than 0.47 psi and higher than 15 psi, without departing from the scope of the present invention.

Controlling the pressure of the air output from the smoke machine 10 is a question of safety of the vehicle. Most passenger vehicles can be tested safely below 2 psi, and turbo charged vehicles can use pressures between 5 and 15 psi for some testing. However, certain models of heavy duty trucks can be safely tested using pressures up to 100 psi. As can be appreciated, the ability to switch pressure level is not limited to only two levels. The safety feature of returning to a safe level of pressure can be used with various pressure levels. For example for a model of the smoke machine 10 for heavy duty trucks, the default low level could be limited to 60 psi, while the higher level that can be selected, for example for brake booster testing, can be limited to 100 psi.

The control unit, and thus the pressure controller 80, of the smoke machine 10 is operably coupled to at least one operation mode indicator 86 (e.g. an indicator light or an auditory indicator). In a specific, non-limiting example of implementation, the control unit is operably coupled to a plurality of operation mode indicators 86, implemented on the housing 12 of the machine 10 itself and/or at the remote controller (e.g. within an application running on a smartphone). In the case of indicator lights 86 on the housing 12 of the machine 10, these lights may be of different colours (e.g. red, green, blue, etc.) and may be lit (or extinguished) by the control unit to indicate various conditions of the operation of the smoke machine 10, including for example: that a power source 47 is successfully connected to the smoke machine 10; that the on/off control 48 has been actuated to turn on the smoke machine 10; that the smoke machine 10 is in a particular pressure operating mode (e.g. LO or HI); etc.

The control unit of the smoke machine 10 may control the power being supplied to the heating element 46. In a specific, non-limiting example of implementation, the control unit may be programmed to energize the heating element 46 when the temperature of the heating element 46 is below a specified temperature and to de-energize the heating element 46 when the temperature of the heating element exceeds a specified temperature. This cycle may continue for as long as the smoke machine 10 is being used to produce smoke.

In order to convey the smoke produced by the smoke machine 10 into a fluid system to check for leaks, a source 84 of pressurized gas is supplied to the chamber 20 through a pressurized gas fluid path. The fluid path begins at an outlet of the source 84 of pressurized gas (such as a pump or an air compressor), which outlet is connected to inlet port 62 on the housing 12, either directly or via a suitable conduit. Optionally, a flow meter may be secured to the housing 12, the fluid path connecting the outlet of the source 84 to the inlet port of this flow meter, where this flow meter may be a simple graduated floating ball flow meter, an electronic flow meter electrically connected to the control unit, or some other type of meter capable of measuring fluid flow rates. As seen in FIG. 2, a conduit 68 extends from the inlet port 62 (or optionally from an outlet port of a flow meter) through a hole in the top cover 14 and down into the chamber 20 through an opening in the conduit 68, to feed the pressurized gas into the chamber 20 of the smoke machine 10.

In a specific, non-limiting example of implementation of the present invention, the pressurized gas fluid path of the smoke machine 10 can include a controllable (e.g. electronic) pressure regulator, the latter being connected to the source 84 of pressurized gas and operably coupled to and powered/controlled by the pressure controller 80. The controllable pressure regulator may be provided within or on the housing 12 of the machine 10 itself or, alternatively, may be provided remote from the machine 10, for example connected to the outlet of the source 84 of pressurized gas and interfacing between this outlet and the inlet port 62 of the machine 10. In the case where the controllable pressure regulator is implemented within the housing 12 of the machine 10, the conduit 68 connects to an inlet of the electronic pressure regulator, the outlet of which feeds directly (or alternatively, via other flow control components, such as a flow valve and/or a pressurized gas flow regulator) into the chamber 20 of the smoke machine 10. The pressure controller 80 is responsive to user-activation of the operating mode selector control 82 to electrically set and/or adjust the set-point of the controllable pressure regulator such that it reduces the incoming gas pressure to the desired pressure. In a specific, non-limiting example, the pressure controller 80 will switch the set-point of the controllable pressure regulator between 1.5 psi (LO) and 7.5 psi (HI), depending on the pressure operating mode selected by the user.

An outlet port 96 on the housing 12 outputs smoke received from a smoke outlet conduit 90, the latter extending from the outlet port 96 through a hole in the top cover 14 and down into the smoke-generating chamber 20. The outlet port 96 is adapted to be coupled to a duct or channel, either directly or via a suitable connector, where this duct or channel is used to convey smoke from the smoke machine 10 to the fluid system being leak checked.

The operation of the smoke machine 10 to detect a leak in a fluid system having a particular inspection pressure requirement is as follows. A supply of pressurized gas from a pressure source 84, such as an air compressor or a pump, is connected to the inlet port 62, whereby this pressurized gas can be supplied to the chamber 20 and its pressure set by controlling a controllable pressure regulator that is provided along the pressurized gas fluid path. The terminals 45 are connected to a power source 47, such as a 12-volt automobile battery. The outlet port 96 is connected via a suitable duct or channel to the fluid system to be leak checked, with or without an adapter (the fluid system possibly requiring one or more plugs to be installed in order to close the system so that it can hold pressure). The pressure controller 80 controls a pressure setting of the controllable pressure regulator to set the smoke machine 10 in a default pressure operating mode (e.g. LO), and will switch the smoke machine 10 into a different predefined pressure operating mode (e.g. HI), by adjusting the setting of the controllable pressure regulator accordingly, when a user activates the respective operating mode selector control 82 depending on the inspection pressure requirement of the fluid system to be checked. Therefore, if the fluid system to be checked is a naturally aspirated internal combustion engine of an automobile, for example, the user would leave the smoke machine 10 in the default LO pressure operating mode; however, if the fluid system to be checked is the boosted (i.e. turbo) engine, the user could simply activate the control 82 (e.g. press the button 82 on the machine 10 or activate the control 82 on a remote controller) to switch the smoke machine 10 from the LO pressure operating mode to the HI pressure operating mode, by adjusting the setting of the controllable pressure regulator accordingly.

Once the smoke machine 10 is properly set-up and connected to the fluid system, the pressure gauge may be checked to ensure that the proper pressure of compressed air is being supplied. With the smoke machine 10 in either the "on" mode in which it is producing smoke, or in the "off" mode in which it is not producing smoke, several different types of known leak tests may be performed with the smoke machine 10 to determine whether there is a leak in the fluid system.

To determine the location of a leak in the fluid system, the smoke machine 10 must be turned on. The on/off control 48 is activated to turn on the smoke machine 10. The control unit then energizes the heating element 46 and turns on the respective indicator light. The control unit will energize the heating element 46 by any suitable process. The heating element 46 vaporizes the liquid on the liquid transfer device 44, which is in the vicinity of the heating element 46, thereby producing smoke. The smoke is conveyed into the fluid system (for example, at the pressure set by the pressure controller 80 in accordance with the user-selected pressure operating mode) and the user then inspects the fluid system for any escaping smoke.

In addition to lighting or extinguishing operating mode indicator lights 86 in order to indicate the various conditions of the operation of the smoke machine 10 (as discussed above), the control unit may optionally implement an auditory indicator, for example auditory signals transmitted via a speaker provided on the top cover 14 of the machine 10 or via the speaker of a smartphone being used as a remote controller, in order to advise the user of various operating conditions of the smoke machine 10. In a specific, non-limiting example, the pressure controller 80 of the control unit triggers the output of a series of warning beeps when the smoke machine 10 is switched into a specific pressure operating mode (e.g. the HI pressure operating mode) to ensure that the user is aware that the smoke machine 10 has acquired and will be operating at the respective test pressure.

Optionally, the control unit is also operative to implement a failsafe mode, for automatically resetting the machine 10 to a predefined, default pressure operating mode. In a specific, non-limiting example of implementation, the pressure controller 80 triggers this operating mode reset 88 when the smoke machine 10 is powered down and then back up, by electrically or wirelessly controlling the setting of the controllable pressure regulator to set the smoke machine 10 in a safe, predefined default pressure. In a specific non-limiting example, the default pressure operating mode is the LO pressure operating mode. In a variant example of implementation, the pressure controller 80 triggers the failsafe mode in response to a signal from a pressure sensor in communication with the hose or channel connected to the fluid system, for example when this pressure sensor indicates a significant drop in pressure (e.g. when the hose or channel is disconnected from the fluid system being tested).

FIG. 1B introduces a variant embodiment, wherein the smoke machine 10 is in fluid communication with a pair of constant sources of pressurized gas 84a and 84b (e.g. a pair of pumps with respective integrated pressure regulators) and the pressure controller with three-way solenoid valve 90 controls which of these sources supplies the pressurized gas to the chamber 20 via the pressurized gas fluid path. In this case, the fluid path of the smoke machine 10 passes through one of the inlet ports of a controllable, three-way solenoid valve of the pressure controller 90, each of which inlet ports is connected to the pressure regulator of a respective one of the air pressure source 1 84a and air pressure source 2 84b, either directly or via a suitable fluid conduit. The solenoid valve of the pressure controller 90 may be mounted to the top cover 14, for example by a bracket. The outlet from the controllable solenoid valve of the pressure controller 90 is connected to the inlet port 62 (or to an inlet port of a flow meter that may also be mounted to the top cover 14). Since the pressurized gas received at the smoke machine 10 from either the air pressure source 1 84a or the air pressure source 2 84b is of constant pressure (i.e. regulated by the respective pressure regulators of the sources), there is no need for an additional controllable pressure regulator within the smoke machine 10 itself or at some other point in the fluid path of the smoke machine 10.

In a specific, non-limiting example, the pressure regulator of the first source 84a is set to regulate the pressure of the gas output from the first source 84a to a constant 1.5 psi (e.g. LO pressure), while the pressure regulator of the second source 84b is set to regulate the pressure of the gas output from the second source 84b to a constant 7.5 psi (e.g. HI pressure).

The solenoid valve of the pressure controller 90, which is an electromechanically operated, bi-directional 3-way valve, is operably coupled to its pressure controller, and has a set-point that determines switching of the inflow between its two inlet ports. On a basis of this set-point, the pressure controller controls the operation of the solenoid valve, and thus the flow of the incoming pressurized gas from either the air pressure source 1 84a or the air pressure source 2 84b, in order to set the operation of the smoke machine 10 in either the first or second pressure operating mode.

In another variant embodiment, the source of pressurized gas (e.g. pump or air compressor) that supplies pressurized gas to the smoke machine 10 is operably coupled to the pressure controller 80 of the smoke machine 10, such that the pressure controller 80 has control over the operation of the source of pressurized gas. In a specific, non-limiting example, the source of pressurized gas (or an electronic pressure regulator of the source) can be set by the pressure controller 80 to output the pressurized gas to the inlet port 62 of the smoke machine 10 at any one of a plurality of different constant pressure levels, in order to set the operation of the smoke machine 10 in a specific one of a plurality of different pressure operating modes. Since the pressurized gas received at the smoke machine 10 from the source is of constant pressure (e.g. regulated by an electronic pressure regulator at the source), there is no need for a pressure regulator within the smoke machine 10 itself. The source of pressurized gas, and/or its electronic pressure regulator, may also be set, either at initial setup or by the pressure controller 80 during operation, to control the flow rate of the pressurized gas output to the smoke machine 10, in which case there is no need for any flow valve and/or pressurized gas flow regulator within the smoke machine 10.

Note that, in a specific non-limiting example of implementation, a wireless remote control technology allows the pressure controller 80 to control the pressure setting of the remote source of pressurized gas. More specifically, a transceiver at the pressure controller 80 and a receiver at the source of pressurized gas (or at its electronic pressure regulator) communicate via a wireless communication protocol (e.g. radio (RF), wireless broadband internet (WLAN, WiFi), cellular, infrared, ultrasonic, etc.).

Note also that, in the case where the source of pressurized air is designed such that its speed of operation is proportional to the pressure of the output gas, it would be possible for the pressure controller 80 to simply set and/or adjust this speed of operation of the source in order to set and/or adjust the pressure of the gas output to the inlet port 62 of the smoke machine 10, and thereby set the operation of the smoke machine 10 in a specific one of a plurality of different pressure operating modes.

Accordingly, in this particular variant example of implementation, it is direct control over the remote source of pressurized gas that allows the pressure controller 80 to control and switch the particular pressure operating mode of the smoke machine 10.

In yet another variant example of implementation of the present invention, the smoke machine 10 is in fluid communication with a high pressure gas source 84 (e.g. a pump or air compressor) and the pressurized gas fluid path within the housing 12 of the smoke machine 10 includes a pair of three-way solenoid valves and a pair of mechanical pressure regulators, which together replace the operation of the controllable pressure regulator discussed above. More specifically, in this example of implementation, the conduit 68 extends from the inlet port 62 (or optionally from an outlet port of a flow meter) down into the chamber 20 and connects to an inlet of a first three-way (or three-port) solenoid valve. Each outlet of the first solenoid valve is connected to a respective mechanical pressure regulator, the outlets of which are both connected to a second three-way solenoid valve. The outlet of the second three-way solenoid valve is connected to a flow valve, which optionally has a control knob that extends through a hole in the side of the main body 16 so that the flow valve may be adjusted during the operation of the smoke machine 10. Alternatively, the flow valve may be an electronic valve which is connected to, and controlled by, the pressure controller 80.

Each of the mechanical pressure regulators may be set to reduce the incoming gas pressure to a respective, desired pressure. In a specific, non-limiting example, the first pressure regulator is set to reduce the incoming gas pressure to a LO test pressure within the range of 0.47 psi to 4 psi, while the second pressure regulator is set to reduce the incoming gas pressure to a HI test pressure within the range of 5 to 15 psi.

Each of the solenoid valves, which are electromechanically operated, bi-directional 3-way valves, are operably coupled to the pressure controller 80, and have a respective set-point that determines switching of the outflow (or inflow) between the two outlet ports (or inlet ports). On a basis of these set-points, the pressure controller 80 electrically controls the operation of each solenoid valve, and thus the flow of the incoming pressurized gas to/from one or the other of the pre-set pressure regulators, in order to set the operation of the smoke machine 10 in either the first or second pressure operating mode.

Optionally, in any or all of the different embodiments described above, a safety mechanism is built into certain components of the smoke machine 10, its pressurized gas fluid path or its source(s) of pressurized gas, in order to ensure that a maximum operating pressure of the smoke machine 10 is not exceeded (which could lead to damage of the fluid system being checked for leaks). In one non-limiting example of implementation, safety check valves (also referred to as safety valves, relief valves, pressure relief valves or pressure safety valves), which particular type of valve is well known in the art, are used to prevent the pressure within the pressurized gas fluid path of the smoke machine 10, and/or at the discharge of the source(s) of pressurized gas, from exceeding preset limits. Such a safety check valve may be used in any one of a source of pressurized gas (e.g. a pump or air compressor), a pressure regulator (mechanical or electronic, either at the source of pressurized gas or within the smoke machine) or a conduit or line (connecting the source and the smoke machine or within the smoke machine itself), as well as in other components of the vapor generating system. For example, a safety check valve of a pressure regulator may be set to blow (or open) at a pressure of 16 psi. In another example, a safety check valve of a pump may be designed to be damaged at 20 psi.

In another non-limiting example of implementation of a safety mechanism for the smoke machine 10, the source(s) of pressurized gas (e.g. pump(s) or air compressor(s)) that are in fluid communication with the smoke machine 10 are designed or built such that they cannot exceed a predefined pressure rating, thereby ensuring that the pressurized gas pumping into the smoke machine 10 does not exceed maximum pressure limits of the smoke machine 10 or of the fluid system(s) being checked.

Reference is now made to FIG. 3 illustrating an exemplary smoke machine 10 with a liquid transfer device surrounding a heating element that does not have a variable pressure system in accordance with the teachings of the present invention. The smoke machine 10 according to an embodiment of the present invention comprises a housing 12 having a top cover 14 and a main body 16, which provide a smoke generating chamber 20. The top cover or lid 14 can be removable for maintenance or for filling the reservoir (a separate fill hole and cap can be provided for filling if desired). A hook (not shown) may be attached to the top cover 14 of the housing 12 for hanging the smoke machine 10 in a convenient location when the smoke machine 10 is being used to test the integrity of a fluid system, for example under the hood of an automobile.

The main body 16 is preferably a machined aluminum component, but may be manufactured by any other suitable process. The main body 16 defines a liquid reservoir 36 within the chamber 20 for holding smoke producing liquid. In order to fill the liquid reservoir 36 with smoke producing liquid, a liquid fill port 38 is optionally provided in the top cover 14, via which port 38 liquid may be poured into the liquid reservoir 36 of the chamber 20. In this example, the liquid fill port is provided on a tubular extension of the top cover 14 and can be sealed shut using a screw-on cap (not shown). Alternatively, in the absence of a liquid fill port 38, the top cover 14 of the housing 12 may simply be removed to allow liquid to be poured into the liquid reservoir 36.

Note that the material of the liquid reservoir 36 is that of the housing 12, e.g. aluminium. However, in a variant embodiment, a liner or insert of any other suitable material which is compatible with the particular smoke producing liquid(s) being used may be provided within the liquid reservoir 36 to contain the liquid.

The machine 10 also optionally includes a liquid level indicator 40 allowing the observation of a level of liquid in the liquid reservoir 36 without removing the top cover 14 of the housing 12. As shown in FIGS. 3 and 4, a specific, non-limiting example of this liquid level indicator 40 is a conduit, such as a tube of transparent plastic material, provided external to the housing 12 and extending between the liquid fill port 38 and a port 39 provided in or near the bottom surface of the housing 12, the port 39 feeding directly into the liquid reservoir 36. In this example, the level of the liquid that can be seen in the tube is indicative of the level of liquid within the reservoir 36. Alternatively, the liquid level indicator 40 may be a dipstick, where the shaft of the dipstick would extend from the top cover 14 via the liquid fill port 38, down through the chamber 20 and into the liquid reservoir 36. As a further alternative a clear window may be provided as a liquid level indicator in the main body 16 to allow visual observation of the liquid within. In such a case, the clear window is preferably made of heat and pressure resistant material and securely sealed to the rest of the main body 16. As yet a further alternative, a level sensor could be provided in the chamber 20. In the case of an electronic level sensor, a low liquid level signal can be connected into the controller to shut down the power supply 47 when the liquid level is too low for operation. A heating element 46 generates heat which is used to vaporise the smoke producing liquid to create smoke. The heating element 46 of this example is an electrically-powered heating element 46 having electrical terminals 45 through which an electric current is provided to the heating element 46. A heating body 102 heats up in response to the application of an electrical current at the electric terminals 45. In this example, the heating element 46 is a ceramic heating element.

A ceramic heating element 46 is a composite ceramic material that can have iron or steel flakes as a conductive filler, as is known in the art of ceramic heating elements (any suitable conductive filler can be used). Alternatively, an electrical resistive heater element core can be surrounded by ceramic material, wherein the ceramic material transmits the heat from the resistive heater element and provides an even high temperature on the surface of the heating element for vaporizing the smoke producing liquid. The ceramic heating element 46 has no exposed metal conductor that can corrode and thus it can provide a longer working life. Also, when the wick 44 needs to be changed, the integrity of the heater 46 is not adversely affected.

The terminals 45 are schematically illustrated in the drawings as passing through the top 14. While not illustrated, insulated terminal blocks can be provided in the top 14 or housing 16, such as in the removable lid or top portion 14, so that terminals 45 can be affixed to the terminal blocks. Alternatively, an electrical connector can be provided in the housing 16 or in the lid or top portion 14 to allow the terminals 45 to be affixed or plugged into the electrical connector. This can provide mechanical support for the heater 102 in addition to electrical connectivity. It will be appreciated that the heater 102 can be arranged horizontally within the housing 16 in addition to the vertical arrangement illustrated.

In a specific, non-limiting example of implementation, the heating element 46 is electrically connected to a power supply of the smoke machine 10, either directly or via a control unit of the smoke machine 10. In the example shown in FIGS. 3 and 4, a pair of terminals 45 are provided on the top cover 14, extending therethrough to connect to a pair of electrical inputs on the heating element 46. In order to power the smoke machine 10, the terminals 45 are electrically connectable to a power supply 47, such as a battery, a transformer or an electrical outlet, for example via extension cables.

A liquid transfer device 44, described in more details below, transfers liquid from the liquid reservoir 36 towards the heating element 45.

In the present example, the smoke machine 10 is configured to provide heat to the heating body 105 that favors the creation of smoke as described above while avoiding the creation of toxic fumes and the over pressurization of the chamber 20. In one example, the heater power supply 47 provides a current to the heating element 45 that results in the heating of the heating element to a controlled temperature sufficient to create evaporation of the smoke-producing liquid while avoiding the combustion of the smoke-producing liquid and of the liquid transfer device 44 and the boiling of the liquid in the liquid reservoir 36. To this end, the heater power supply 47 is controlled to provide an electrical current that maintains the heating element in a state of generating heat that is within such a safe range. In one particular example of implementation, the heater power supply 47 provides a constant voltage that generates current in the heating element 46 that allows the heating body 102 to heat to a temperature at which the liquid evaporates but which does not cause dangerous combustion or pressure buildup.

To this end, the current provided, heating element and liquid are selected in light of one another. In one particular example, mineral oil is used which generates evaporate smoke at about 300 degrees Celsius. A ceramic heating element is selected and supplied with a power which according to its specification creates a temperature in the heating body 102 of about 300 degrees.

Now in the present example, in order to vaporize the liquid, the liquid is transferred to the surface of the heating body 102 by the liquid transfer device 44 such that when the heating element 46 is energized and heated, the smoke producing liquid provided by the liquid transfer device 44 will be vaporized into smoke within the chamber 20. The liquid transfer device 44 may be affixed to the heating element 46, and more particularly to the heating body 102 by friction fit, as is the case in the illustrated examples.

In a specific, non-limiting example of implementation, a liquid transfer device 44 extends from within the chamber 20 down into the liquid reservoir 36. The liquid transfer device comprises a first portion 104 that contacts the heating body 102 and a second portion 106 projecting from the first portion, extending downwards in the illustrated examples, into the liquid reservoir 36. In this example, the second portion extends towards the bottom of the liquid reservoir 36 nearly reaching to the bottom.

In the present example, the liquid transfer device 44 is a wicking liquid transfer device which uses primarily capillary action to convey smoke producing liquid from the liquid reservoir 36 up towards the heating element 46. As is well known in the art, capillary action refers to the motive force on a liquid produced by the surface tension between the liquid and a surface, in this case the smoke producing liquid and the material of the liquid transfer device 44.

In order to prevent the generation of unwanted combustion smoke and the premature wearing of the liquid transfer device 44, the liquid transfer device 44 of this example comprises material that is able to withstand very high temperatures while also producing enough capillary action to convey the liquid from the liquid reservoir 36 to the heating element 46. In a specific, non-limiting example of implementation, the liquid transfer device 44 is a "loose" bundle of fibreglass fibers that are not braided, twisted or woven. The fibers are collected and arranged sufficiently close to each other to wick the smoke generating liquid up from the reservoir and onto the heater. This requires sufficient proximity for capillary action to take place, without such tightness that capillary action is prevented. The ability to wick also depends on the properties of the smoke generating liquid, and in the case of baby oil, loose fibreglass fibers are drawn into one another by the surface tension of the liquid and wicking works well. Fiberglass is an example of a material that resists the temperature of the heater (around 300 degrees Celsius) well. Alternatively, a woven wick, twisted or braided cord made of suitable wicking fibers can be used as long as temperature resistance and wicking ability are present. The wick or wicking fibers can convey an adequate amount of liquid by capillary action to the heating element to produce an ample amount of smoke.

Advantageously, rather than using a filament heating element that is wrapped around the liquid transfer device, in the illustrated example, the liquid transfer device 44 itself surround the heating element 46 or part thereof. This makes installing, and replacing the liquid transfer device 44 a simple task and also allows the liquid transfer device 44 to potentially contact the entire heating surface of the heating element 46.

As shown in FIG. 3, here the liquid transfer device 44 comprises a wicking bundle of fiberglass fibers that is wrapped around the heating body 102 to substantially surround it, viz. to surround it about at least a portion of its length. The wicking bundle can alternatively comprise a variety of synthetic or natural fibers and can be braided cord, twisted cord, a woven fabric or of any suitable bundling of the fibers that can provide wicking. In this case, the wicking bundle is wrapped around the heating body 102 from the bottom of the heating body up to the top and therefore essentially completely covers the surface area of the heating body 102 save perhaps for a few millimeters at the top and minor portions that may be visible between wraps. Despite such imperfections in the wrapping, the liquid transfer device 44 is said to completely cover the surface of the heating body 102 since it does not leave a significant portion of the heating body uncovered.

In order to hold the first portion 104 of the liquid transfer device 44, that is the wicking fiber bundle, in place, the wicking fiber bundle is wrapped around the heating body 102. Provided that the presence of the liquid does not interfere with heating element 46 operation, the wicking fiber bundle may be also wrapped around other portions of the heating element 46.

The wicking fiber bundle is tightly wrapped around the heating body and held in place by a suitable mechanism. In the example of FIG. 3, the wicking fiber bundle is tied into place using the fiber bundle itself at the bottom and at the top of the ceramic heater. Different techniques may be used to wrap and tie off the wicking fiber bundle. In order to maintain the wicking fiber bundle in place and prevent it from unravelling from the end opposite the tie off, that end may be passed underneath the coil to hold it in place. In one example, the wicking fiber bundle may be run vertically along the heating body 102, folded down, and then coiled over itself around the heating body towards the bottom where it may be tied with the free-hanging portion. In another example, the wicking fiber bundle maybe wrapped a first time (or several times) around the bottom of the heating body 102, passed underneath the coils and continue to be coiled up to the top where it can be tied to itself. The wicking fiber bundle can also be tied off against other elements of the smoke machine 100, such as the conduits 68 and/or 90.

When coiling the wicking fiber bundle, a certain tension is applied to create a pressure against said heating body 102. In general, pressure is imparted by the liquid transfer device 44 onto the heating body 102, the liquid transfer device being compressed against the heating body 102. The pressure creates friction between the liquid transfer device 44 and the heating element 46, particularly here the heating body 102, that holds the liquid transfer device in place and keeps it in contact with the heating body 102.

In the illustrated example, it is the first portion 104 of the liquid transfer element 44 that is in contact with the heating body 102. Now when generating pressure upon the heating body, it is preferable that the pressure provided fully presses the first portion 104 against the heating body 102, however if too much pressure is applied to a wicking device, this may compress the capillary passages to the point of inhibiting or completely preventing wicking. Indeed wicking devices rely on the presence of small passages, typically spaces between fibers to wick liquids. If the device is too compressed, for example if the wicking fiber bundle of the example of FIG. 3 is wound too tightly, the inter-fiber spaces may be reduced to the point of no longer wicking properly or at all. Therefore, the pressure applied is selected to be between a minimum pressure to press the first portion 104 against the heating body 102 (preferably firmly so as to effect a friction fit) and a minimum pressure that compresses the capillary passages within the first portion 104 to the point of preventing, or preferably significantly inhibiting, wicking.

In order to achieve such a pressure, the wicking fiber bundle may be wrapped as loosely as will still allow a firm friction hold against the heating body 102. The level of tightness required may be ascertained coiling it as loosely as possible and feeling whether proper purchase is achieved, tightening the coil if necessary. In order to ensure that the coil does not exceed a minimum pressure to prevent, or significantly inhibit wicking, a liquid may then be introduced to the second portion 106 and wicking effect is observed. It is helpful to provide a colored liquid of viscosity similar to that which is used in the smoke machine 10 to visually observe wicking while providing in-machine conditions. Once the proper level of pressure, in this case fiber bundle tension, is ascertained, it may be used for all smoke machines.

It will be appreciated that installation and replacement of the liquid transfer device 44 of the above example does not require special tools or abilities, but can be performed by unskilled workers in short time. In particular, a spent wick may be untied or cut off and a new one may be installed as described above. If the appropriate coiling tension has already been discovered, the wicking testing may be avoided.

The liquid transfer device 44 may be other forms of wicks, similarly coiled or wrapped around the heating body 102.

Although in the example provided in FIG. 3, the wicking fiber bundle was tied in place, other mechanisms for holding the liquid transfer device 44 may be used. In particular, a fastener may be used to hold the liquid transfer device 44 in friction fit.

FIG. 4 illustrates an example of a smoke machine 10 where the liquid transfer device 44 is held by a fastener 108. As shown, the liquid transfer device 44 of this example also comprises a first portion 104 that surrounds the heating body 102 and a second portion 106 that extends into the liquid reservoir 36, however it is held against the heating body 102 by one or more fasteners 108, which in this example are clamps and more particularly hingeless resilient clamps. The liquid transfer device 44 may still comprise a coiled wicking fiber bundle, but instead of (or on top of) being tied off onto the heating body 102, the coil is held in place by the fasteners 108. Two clamps are used in this example but more or fewer may be used, depending on the size and nature of the heating body 102 and first portion 104.

The fasteners 108 hold the first portion against the heating body 102 and create friction therebetween thereby effecting or reinforcing the friction fit.

In the example of FIG. 4, the liquid transfer device 44 is a tubular wick that surrounds in the first portion 104 the heating body 102. The heating body 102 is thus inserted into the liquid transfer device. Below the heating body 102 in the second portion 106, the liquid transfer device splits into separate tongues to better disperse within the liquid in the liquid reservoir 36. This detail is optional and may be achieved, e.g., by cutting slits into the bottom of the tubular wick.

In order to achieve the proper pressure, as described above, between the liquid transfer device 44 and the heating element 46, the fasteners 108 are configured to apply a pressure that is between the minimum pressure to press the first portion 104 against the heating body 102 and the minimum pressure to compress capillary passages within the first portion 104 to the point of preventing or significantly inhibiting wicking. They are also spaced apart closely enough, and the liquid transfer device 44 is stretched between clamps enough, to maintain a pressure of this range in the areas of the first portion 104 between the clamps. In this example, the resilient fasteners are selected with a gauge and resilient spring force that holds the liquid transfer device 44 firmly in place but does not prevent wicking. The same method for ascertaining whether wicking is prevented as described above may be used. Once a suitable fastener is selected, it may be used for all smoke machines 10.

Although not preferable, fasteners that exceed the minimum pressure to prevent or significantly impede wicking may be used, particularly if they are thin enough, and spaced apart far enough to affect a small portion of the first portion 104. However, such fasteners may prevent wicking of liquid up above them and therefore they should preferably only clamp a portion of the area around the heating body 102, not surround it completely, lest the lowest fastener prevent liquid from flowing above it at all.

A tubular wick may be used without the fasteners 108, particularly if it a resilient ("stretchy") tubular wick that can be stretched over the heating body 102. In particular if such a tubular wick has a bore with a cross sectional area at rest ("unstretched") that is smaller than the cross sectional area (in the same plane, when aligned) of the heating body 102 to be inserted in it, a friction fit may be created by the resilience of the tubular wick in the stretched area. Thus in the example of FIG. 4, if the tubular wick were a "stretchy" resilient tubular wick that was stretched over the heating body 102, the friction fit may be effected, at least partially, by the tension of the tubular wick over the heating body 102 as provided by the resilience in the wick. In such a case the fasteners 108 may be omitted, or they may still be provided to even better secure the tubular wick to the heating element 46.

It will be appreciated that installation and replacement of the liquid transfer device 44 of the above example does not require special tools or abilities, but can be performed by unskilled workers in short time. In particular, when a wick is spent, the fasteners 108 may easily be removed, in this example simply forced open and pushed off, and the spent wick may be slid off or cut away. If no fasteners are used, then the wick may simply be forced-slid off or cut away. A new wick may then be slid over the heating body 102, with stretching if necessary, and the fasteners 108 may be reinstalled, e.g. by forcing them open and pushing them into place. New fasteners 108 may be provided if the old ones are spent, thus providing an easy way to replace the fasteners 108 as well.

Although in the above examples, the heating element 46 was a ceramic heating element, different types of heating elements 46 are also possible and may be used in combination with the liquid transfer device 44 to heat the smoke producing liquid on the liquid transfer device 44. For example, in a variant implementation, the heating element 46 is a coil of resistive wire that generates heat when an electrical current is conducted therethrough, normally by placing an electrical voltage across the wire. In this case, the liquid transfer device 44 may surround the outside of the wire coil. A reflective inner tube may be provided inside the wire coil to reflect radiation from the coil back outside towards the liquid transfer device 44. Thus the wire may heat the smoke producing liquid on the upper portion of the liquid transfer device 44 in order to generate the smoke.

Also, it should be noted that liquid transfer devices other than those of the above examples may be used. Different materials or combinations of materials, characterized by similar thermal insulation and capillary action, may also be used for the liquid transfer device 44. More specifically, the liquid transfer device 44 may be any other suitable device which can adequately convey liquid from the liquid reservoir 36 to the heating element 46 primarily by capillary action.

In order to convey the smoke produced by the smoke machine 10 into a fluid system to check for leaks, a source 84 of pressurized gas is supplied to the chamber 20 through a pressurized gas fluid path. The fluid path begins at an outlet of the source 84 of pressurized gas (such as a pump or an air compressor), which outlet is connected to inlet port 62 on the housing 12, either directly or via a suitable conduit. Optionally, a flow meter may be secured to the housing 12, the fluid path connecting the outlet of the source 84 to the inlet port of this flow meter, where this flow meter may be a simple graduated floating ball flow meter, an electronic flow meter electrically connected to the control unit, or some other type of meter capable of measuring fluid flow rates. As seen in FIGS. 3 and 4, a conduit 68 extends from the inlet port 62 (or optionally from an outlet port of a flow meter) through a hole in the top cover 14 and down into the chamber 20 through an opening 110 in the conduit, to feed the pressurized gas into the chamber 20 of the smoke machine 10.

An outlet port 96 on the housing 12 outputs smoke received from a smoke outlet conduit 90, the latter extending from the outlet port 96 through a hole in the top cover 14 and down through an opening 112 into the smoke-generating chamber 20. The outlet port 96 is adapted to be coupled to a duct or channel, either directly or via a suitable connector, where this duct or channel is used to convey smoke from the smoke machine 10 to the fluid system being leak checked.

The smoke machine 10 includes a control unit, which may be configured to implement various different functionalities, including for example measuring the temperature of the heating element 46; setting one or more indicators (e.g. turning on and off one or more indicator lights); detecting the polarity of and turning on and off the power to the heating element 46 based on temperature and/or cycle-time criteria; detecting activation of a control, the latter being either provided on the housing 12 or in wireless communication with the control unit of the machine 10; setting or adjusting a set-point of a solenoid valve; controlling and/or setting an electronic pressure regulator; controlling the operation of one or more remote sources of pressurized air; turning on and off auditory signals; implementing a failsafe mode; etc.

The control unit of the smoke machine 10 may be implemented in hardware, software or a combination thereof, either locally to the smoke machine 10, remotely from the smoke machine 10 or both locally and remotely. In a specific, non-limiting example of implementation, the control unit of the smoke machine 10 is fully implemented within the machine 10 itself, by a printed circuit board having a power switch, where this power switch is operably coupled to a manually activatable on/off button or switch 48 located on the housing 12, for example on the top cover 14. In another non-limiting example of implementation, the control unit of the machine 10 includes both a printed circuit board within the smoke machine 10 and a remote controller in wireless communication with the printed circuit board, where this remote controller implements a plurality of controls (including for example an on/off control 48) that are activatable by a user of the remote controller to transmit wireless control signals to the circuit board for controlling the operation of the smoke machine 10.

The above-described embodiments and examples of implementation of the present invention have been presented for illustration purposes, but additional variants and modification are possible and should not be excluded from the scope of the present invention.

What is claimed is:

1. A smoke generating device for connection to a source of pressurized gas, said device comprising:
    a housing defining a chamber, the chamber including a liquid reservoir for holding a supply of liquid;
    a heating element disposed within said chamber;
    a gas inlet for connection to the source of pressurized gas at a predetermined pressure;
    a gas supply fluid path extending from the source of pressurized gas to said gas inlet, through said housing and into said chamber;
    a liquid transfer device configured to convey a liquid from said liquid reservoir to said heating element;
    an outlet conduit in fluid communication with said chamber and configured to convey vapor from said chamber; and
    a control unit including a pressure controller responsive to activation of a manually-actuated operating mode selector control to switch said smoke generating device between at least first and second pressure operating modes, in said first pressure operating mode said smoke generating device being capable to output and maintain for a period of time pressurized vapor at a first fixed test pressure within a range of 0.5 to 2.5 psi and in said second pressure operating mode said smoke generating device being capable to output and maintain for a period of time pressurized vapor at a second fixed test pressure within a range of 5 to 15 psi.

2. A smoke generating device as defined in claim 1, wherein said gas supply fluid path includes a controllable pressure regulator in fluid communication with said source of pressurized gas, said pressure controller operative to control a pressure setting of said pressure regulator in order to set said smoke generating device in one or the other of said first and second pressure operating modes.

3. A smoke generating device as defined in claim 1, wherein said device is for connection to first and second constant sources of pressurized gas, said device comprising first and second gas inlets for connection to said first and second sources, respectively, said pressure controller operative to control which of said first and second gas inlets supplies gas to said gas supply fluid path of said smoke generating device in order to set said smoke generating device in one or the other of said first and second pressure operating modes.

4. A smoke generating device as defined in claim 1, wherein said pressure controller is operative to control said source of pressurized gas to set a pressure of the gas output by said source of pressurized gas in order to set said smoke generating device in one or the other of said pressure operating modes.

5. A smoke generating device as defined in claim 1, wherein said pressure controller is operative to implement a failsafe mode by automatically setting said smoke generating device in a default one of said first and second pressure operating modes when said smoke generating device is initially powered up.

6. A smoke generating device as defined in claim 1, wherein a safety mechanism is built into said device to ensure that a pressure of said pressurized vapor output by said device does not exceed a preset maximum limit.

7. A smoke machine for connection to a source of pressurized gas at a predetermined pressure and operative to generate smoke at a test pressure for output to a closed fluid system to be tested for leaks, said smoke machine capable to switch between first and second pressure operating modes in response to activation of a user-actuated operating mode selector control, in said first pressure operating mode said smoke machine outputting and maintaining for a period of time smoke at a first default fixed test pressure and in said second pressure operating mode said smoke machine outputting and maintaining for a period of time smoke at a second fixed test pressure, wherein, following user input provided at an on/off control to conduct a leak test, said smoke machine increases to and is maintained at said first fixed test pressure unless user input is received at said operating mode selector control to operate at said second fixed test pressure, and wherein user input provided at said operating mode selector control is required to switch to said second fixed test pressure from said first default fixed test pressure.

8. The smoke machine as defined in claim 7, wherein said operating mode selector control is a switch.

9. The smoke machine as defined in claim 7, wherein said operating mode selector control is a button.

10. A smoke generating device for connection to a source of pressurized gas, said device comprising:
    a housing defining a chamber, the chamber including a liquid reservoir for holding a supply of liquid;
    a heating element disposed within said chamber;
    a gas inlet for connection to the source of pressurized gas at a predetermined pressure;
    a gas supply fluid path extending from the source of pressurized gas to said gas inlet, through said housing and into said chamber;
    a liquid transfer device configured to convey a liquid from said liquid reservoir to said heating element;
    an on/off control to at least one of start and stop a leak test;
    an outlet conduit in fluid communication with said chamber and configured to convey vapor from said chamber; and
    a control unit including a pressure controller responsive to activation of a manually-actuated operating mode selector control, following user input at said operating mode selector control, to switch said smoke generating device between at least first and second pressure operating mode, in said first pressure operating mode said smoke generating device being capable to output and maintain for a period of time pressurized vapor at a first fixed test pressure and in said second pressure operating mode said smoke generating device being capable to output and maintain for a period of time pressurized vapor at a second fixed test pressure.

* * * * *

UNITED STATES PATENT AND TRADEMARK OFFICE
CERTIFICATE OF CORRECTION

PATENT NO. : 10,393,612 B2
APPLICATION NO. : 15/848971
DATED : August 27, 2019
INVENTOR(S) : Jeffrey Lerman, Nathan Goldman and Changbin Quan It is certified that error appears in the above-identified patent and that said Letters Patent is hereby corrected as shown below:

In the Specification

1. In Column 6, Line 38, delete "depend" and insert -- depends --, therefor.
2. In Column 7, Line 32, delete "100," and insert -- 10, --, therefor.
3. In Column 7, Line 43, delete "element" and insert -- device --, therefor.
4. In Column 9, Line 28, delete "housing 16," and insert -- housing 12, --, therefor.
5. In Column 9, Line 31, delete "housing 16" and insert -- housing 12 --, therefor.
6. In Column 9, Line 36, delete "housing 16" and insert -- housing 12 --, therefor.
7. In Column 9, Line 61, delete "105" and insert -- 102 --, therefor.
8. In Column 25, Line 29, delete "housing 16," and insert -- housing 12, --, therefor.
9. In Column 25, Line 32, delete "housing 16" and insert -- housing 12 --, therefor.
10. In Column 25, Line 37, delete "housing 16" and insert -- housing 12 --, therefor.
11. In Column 25, Line 52, delete "45." and insert -- 46. --, therefor.
12. In Column 25, Line 54, delete "105" and insert -- 102 --, therefor.
13. In Column 25, Line 58, delete "45" and insert -- 46 --, therefor.
14. In Column 27, Line 46, delete "100," and insert -- 10, --, therefor.
15. In Column 27, Line 58, delete "element" and insert -- device --, therefor.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*